United States Patent
Fujino et al.

(10) Patent No.: US 8,121,775 B2
(45) Date of Patent: Feb. 21, 2012

(54) MISFIRE DETECTING DEVICE FOR WATER JET PROPULSION WATERCRAFT

(75) Inventors: Kenichi Fujino, Shizuoka (JP);
Shigeyuki Ozawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 617 days.

(21) Appl. No.: 12/370,705

(22) Filed: Feb. 13, 2009

(65) Prior Publication Data
US 2009/0240423 A1 Sep. 24, 2009

(30) Foreign Application Priority Data
Mar. 19, 2008 (JP) ................. 2008-071024

(51) Int. Cl.
*G06F 19/00* (2006.01)
*F02P 5/15* (2006.01)
*F02D 41/22* (2006.01)
*B63H 21/21* (2006.01)
*G01M 15/00* (2006.01)

(52) U.S. Cl. .......... 701/114; 701/111; 123/406.24; 123/406.45; 123/436; 440/87; 73/114.04

(58) Field of Classification Search .......... 123/406.24, 123/406.26, 406.27, 406.58, 406.59, 435, 123/436; 701/101–105, 110, 111, 114, 115; 73/114.01, 114.04; 702/182, 183
See application file for complete search history.

(56) References Cited

U.S. PATENT DOCUMENTS

| | | | | |
|---|---|---|---|---|
| 5,263,364 A | * | 11/1993 | Nakayama et al. | 73/114.04 |
| 5,503,132 A | * | 4/1996 | Miyata et al. | 123/630 |
| 5,754,051 A | * | 5/1998 | Miyata et al. | 324/393 |
| 5,828,217 A | * | 10/1998 | Inagaki et al. | 324/393 |
| 5,970,951 A | | 10/1999 | Ito | |
| 6,655,343 B2 | * | 12/2003 | Suzuki et al. | 73/114.58 |
| 6,768,308 B2 | * | 7/2004 | Hanazaki et al. | 324/378 |

FOREIGN PATENT DOCUMENTS

| | | | | |
|---|---|---|---|---|
| JP | 58117326 A | * | 7/1983 | 701/114 |
| JP | 3321007 B2 | | 9/2002 | |

* cited by examiner

*Primary Examiner* — Willis Wolfe, Jr.
(74) *Attorney, Agent, or Firm* — Keating & Bennett, LLP

(57) ABSTRACT

A misfire detecting device is provided for a water jet propulsion watercraft in which a propulsion unit operates through an operation of an engine to propel the water jet propulsion watercraft. The misfire detecting device includes injectors arranged to inject fuel into the engine under a fuel injection amount adjusting control implemented by an electric control device, ignition plugs arranged to ignite the fuel injected into the engine from the injectors to operate the engine, an oxygen sensor arranged to detect that a misfire occurs in the engine, a warning lamp and buzzer arranged to inform that the misfire occurs, etc. The misfire detecting device prevents the warning lamp and the buzzer from informing the warning if the misfire is caused through the control by the electric control device. Accordingly, the misfire detecting device for a water jet propulsion watercraft ensures that an operator cannot mistake a misfire caused under a control for a misfire caused due to an abnormality of an engine or other components thereof.

26 Claims, 28 Drawing Sheets

MISFIRE DETECTING DEVICE FOR WATER JET PROPULSION WATERCRAFT

BACKGROUND OF THE INVENTION

1. Field of the Invention

The present invention relates to a misfire detecting device for a water jet propulsion watercraft that has an engine and a jet pump operated by the engine to propel the watercraft.

2. Description of the Related Art

Some kinds of water jet propulsion watercrafts are constructed to prevent mechanical troubles from occurring when an engine rotates in an excessively high speed range by controlling the engine to misfire at a predetermined misfire rate if an engine speed reaches a predetermined engine speed (for example, see JP-B-3321007). A water jet propulsion watercraft disclosed in JP-B-3321007 retards ignition timing of the engine when the engine speed reaches an engine speed set at a level immediately before a predetermined high speed. If the engine speed exceeds the predetermined high speed even though such a control is implemented, the water jet propulsion watercraft raises the misfire rate of the engine to be higher than the misfire rate given immediately before the engine speed reaches the predetermined high speed and also advances the ignition timing.

Thus, the engine speed decreases when the engine speed is about to reach the predetermined high speed so that the engine speed is restrained to be below the predetermined high speed. If, however, the engine speed reaches the predetermined high speed notwithstanding the restraint, the misfire rate is raised to effectively decrease the engine speed. Thereby, the engine speed is more surely prevented from largely exceeding the predetermined high speed. Accordingly, engine troubles caused by excessive operations can be prevented.

However, engines often have not only the intentional misfire caused under such a control but also unintentional misfires caused due to damage or deterioration of ignition plugs. Particularly, engines for water jet watercrafts have a lot of potential for unintentional misfires because water can more easily enter the inside of watercraft engines than engines for automobiles or the like. If such an unintentional misfire occurs, unburnt gases remain and deteriorate the properties of exhaust gases. After-fire thus can occur in an exhaust conduit. In addition, if a catalyst is disposed inside of the exhaust conduit, the catalyst can be deteriorated by the after-fire.

Hence, it is desirable to detect the occurrence of the misfire and warn an operator of the misfire and further to implement an engine control whereby both the deterioration of the properties of exhaust gases and the deterioration of the catalyst can be minimized. However, the conventional water jet propulsion watercraft described above can have not only the abnormal misfire but also the intentional misfire generated by the controller. If, therefore, warnings are provided for all types of misfires, the operator may mistakenly believe that the engine has some abnormality.

SUMMARY OF THE INVENTION

In order to overcome the problems described above, preferred embodiments of the present invention provide a misfire detecting device for use in a water jet propulsion watercraft such that, for example, an operator cannot mistake an intentional misfire for an unintentional misfire caused due to abnormality of an engine or other components thereof.

Structural features of a misfire detecting device for a water jet propulsion watercraft configured in accordance with a preferred embodiment of the present invention include a misfire detecting device for a water jet propulsion watercraft having an engine and a jet pump operated by the engine to propel the watercraft, the misfire detecting device including a fuel injecting device arranged to inject fuel into the engine under a fuel injection amount adjusting control by a fuel injection control device, an igniting device arranged to ignite the fuel injected into the engine from the fuel injecting device to operate the engine, a misfire control device arranged to stop the igniting device from firing of the fuel when a predetermined misfire condition is satisfied, a misfire detecting device arranged to detect that a misfire has occurred in the engine, a misfire indicating device arranged to indicate that the misfire occurs when the misfire detecting device detects an occurrence of the misfire in the engine, and an indicating inhibiting device arranged to inhibit the misfire indicating device from indicating if the misfire detected by the misfire detecting device is a misfire caused by a control operation performed by the misfire control device.

In the misfire detecting device for a water jet propulsion watercraft, the indicating device indicates that a misfire occurs when the engine has experienced the misfire. If the misfire is an intentional misfire caused by a control operation performed by the misfire control device, the indicating inhibiting device inhibits the indicating device from providing an indication of the misfire. Hence, the indicating device provides an indication that a misfire has occurred only when an abnormal misfire occurs. An operator cannot mistake the intentional misfire caused by a control operation performed by the misfire control device for a misfire caused due to any abnormality of the engine or the like.

Devices which provide a misfire indication, either visually or aurally, such as warning lamps, buzzers and so forth, can preferably be used as the misfire indicating device, for example. The misfire caused by a control operation performed by the misfire control device is generated upon satisfaction of the predetermined misfire condition such that the misfire is appropriate for the engine. With the misfire occurring, the fuel injection by the fuel injecting device and the ignition by the igniting device are also stopped. Thus, no unburnt gases remain even though the misfire occurs. Accordingly, the after-fire, i.e., burning of unburnt gases, does not occur in an exhaust conduit. The indicating inhibiting device can be configured with a program or programs executed by a control device.

Other structural features of a misfire detecting device for a water jet propulsion watercraft configured in accordance with a preferred embodiment of the present invention include a misfire detecting device for a water jet propulsion watercraft having an engine and a jet pump operated by the engine to propel the watercraft, the misfire detecting device including a fuel injecting device arranged to inject fuel into the engine under a fuel injection amount adjusting control performed by a fuel injection control device, an igniting device arranged to ignite the fuel injected into the engine from the fuel injecting device to operate the engine, a misfire control device arranged to stop the igniting device from firing the fuel when a predetermined misfire condition is satisfied, a misfire detecting device arranged to detect that a misfire other than a misfire caused by a control operation performed by the misfire control device occurs in the engine, and an abnormal misfire indicating device arranged to indicate that the misfire occurs when the misfire detecting device detects occurrence of the misfire in the engine.

Thereby, no indicating inhibiting device arranged to inhibit the misfire indicating device from providing a misfire indication is necessary because the misfire detecting device does not detect the misfire caused by a control operation performed by the misfire control device but detects only the misfire caused due to the occurrence of an abnormality. That is, the abnormal misfire indicating device, when the misfire detecting device detects some abnormal misfire of the engine, simply provides an indication of the occurrence of the misfire. In this regard, a controlled misfire indicating device which indicates that the misfire caused under the control by the misfire control device occurs can be added. By adding this device, all of the misfires can be indicated. Also, the operator will not mistake the misfire caused due to an abnormality and the misfire caused due to a control operation for one another.

Further structural features of the misfire detecting device for a water jet propulsion watercraft configured in accordance with a preferred embodiment of the present invention include that the misfire detecting device is preferably configured with engine speed fluctuation detecting device arranged to detect a fluctuation of an engine speed, and the misfire detecting device determines that the misfire other than the misfire caused by a control operation performed by the misfire control device occurs when a fluctuation width of the engine speed detected by the engine speed fluctuation detecting device is out of a preset fluctuation width reference value of the engine speed.

The fluctuation width of the engine speed in this regard can include not only a fluctuation width of the rise of the engine speed but also a fluctuation width of the decrease of the engine speed. If the engine speed is different from a reference value of the fluctuation width preset based upon a fluctuation width per predetermined time period, i.e., the engine speed abruptly fluctuates, the misfire detecting device determines that some abnormal misfire other than the misfire caused by a control operation performed by the misfire control device occurs. The preset fluctuation width reference value in this regard can be a fixed value set as a fluctuation width of a normal engine speed or a value that is replaced and stored one after another while being continuously renewed. For example, the value can be a value that may be determined to be in a normal fluctuation range that has a predetermined width given by calculating an average value of a fluctuation width of the engine speed per predetermined time period and renewing the average value one after another.

The misfire detecting device determines that the misfire caused due to an abnormality of the engine or other components thereof occurs when the engine speed fluctuation width is out of the reference value of the fluctuation width. Additionally, the engine speed fluctuation detecting device can be provided with a crankshaft angle sensor normally attached to an engine that operates under an electronic control and arranged to detect a rotational angle of a crankshaft, a cam position sensor normally placed in close proximity to a cylinder of the engine and arranged to detect a rotational position of a cam that rotates following reciprocal movement of a piston and so forth. Because of these features, no additional device is necessary, and parts do not increase in number. In addition, cost reduction, engine downsizing, weight reduction and so forth can be made.

Further structural features of a misfire detecting device for a water jet propulsion watercraft configured in accordance with a preferred embodiment of the present invention include that the misfire detecting device is preferably configured with air-fuel ratio detecting device arranged to detect an air-fuel ratio of exhaust gases discharged from the engine based upon a predetermined output voltage characteristic, the misfire detecting device implements the fuel injection amount adjusting control by the fuel injection control device when a voltage value based upon the air-fuel ratio detected by the air-fuel ratio detecting device is in a range of normal voltage values, and the misfire detecting device determines that the misfire other than the misfire caused by a control operation performed by the misfire control device occurs when the voltage value based upon the air-fuel ratio detected by the air-fuel ratio detecting device is higher or lower than the normal voltage value range and stops the fuel injection amount adjusting control by the fuel injection control device.

If the misfire caused by an abnormality occurs, unburnt gases remain and an air-fuel ratio of exhaust gases is significantly different from a reference value. Under this condition, if the fuel injection control device continues the fuel injection under the fuel injection amount adjusting control, a fuel injection amount becomes inappropriate and a desirable engine output can be lost. This is because, in an engine having a plurality of cylinders, even if a misfire occurring in one or some cylinders gives rise to an abnormality in the air-fuel ratio thereof, the misfire detecting device erroneously determines that air-fuel ratios of all the cylinders have become abnormal. Hence, no fuel injection amount adjusting control is implemented by the fuel injection control device; thereby, the fuel injection amount can be kept in an appropriate range. Under this condition, the fuel amount injected by the fuel injecting device is fixed, or the fuel injection made by the fuel injecting device is ceased. As an air-fuel ratio detecting device, an oxygen sensor or an exhaust gas sensor can be used.

Further structural features of the misfire detecting device for a water jet propulsion watercraft configured in accordance with a preferred embodiment of the present invention include that the engine is preferably a multi-cylinder engine having a plurality of cylinders, exhaust conduits extending from exhaust ports of the respective cylinders merge into a manifold, the misfire detecting device is configured with an air-fuel ratio detecting device each piece of which is positioned between the exhaust port of the respective exhaust conduit and the manifold arranged to detect an air-fuel ratio of exhaust gases discharged from the engine based upon a predetermined output voltage characteristic, the misfire detecting device implements the fuel injection amount adjusting control by the fuel injection control device when a voltage value based upon the air-fuel ratio detected by the air-fuel ratio detecting device is in a range of normal voltage values, and the misfire detecting device determines that the misfire other than the misfire caused under the control by the misfire control device occurs when the voltage value based upon the air-fuel ratio detected by the air-fuel ratio detecting device is higher or lower than the normal voltage value range and ceases the fuel injection to the cylinder on which the misfire detecting device determines that the misfire other than the misfire caused under the control by the misfire control device occurs.

According to the above features, because the air-fuel ratio detecting device is provided to each exhaust conduit extending from the respective cylinder, the misfire detecting device can determine which cylinder has a misfire and can cease the fuel injection to the cylinder that has the abnormal misfire. As a result, unburnt gases are prevented from mingling with exhaust gases. The properties of exhaust gases can be kept in a good condition. Additionally, the normal voltage value based upon the air-fuel ratio can be set in a map or maps using an engine speed, a throttle valve opening, an intake pressure and so forth.

Further structural features of the misfire detecting device for a water jet propulsion watercraft configured in accordance with a preferred embodiment of the present invention include that the engine is preferably a multi-cylinder engine having a plurality of cylinders, the misfire detecting device is configured with a vibration detecting device, each portion of which is provided at the respective cylinder for detecting a vibration of the engine, the misfire detecting device compares an occurrence timing of a combustion signal based upon the vibration of the engine detected by each piece of the vibration detecting device and an occurrence timing of an ignition signal inputted to the igniting device, and the misfire detecting device determines that the misfire other than the misfire caused by a control operation performed by the misfire control device occurs when an output amount of the combustion signal occurring in response to the ignition signal is lower than a preset normal output reference value of the combustion signal and ceases the fuel injection to the cylinder on which the misfire detecting device determines that the misfire other than the misfire caused by a control operation performed by the misfire control device occurs.

According to the above features, because the vibration detecting device is provided to each exhaust conduit extending from the respective cylinder, the misfire detecting device can determine which cylinder has a misfire and can cease the fuel injection to the cylinder that has the abnormal misfire. As a result, unburnt gases are prevented from mingling with exhaust gases. The properties of exhaust gasses can be kept in a good condition. Even if the exhaust conduit has a catalyst, after-fire is prevented from occurring, and the catalyst can be kept in a good condition. Additionally, as the vibration detecting device, a knocking sensor can be used, for example. Because the knocking sensor only needs to be attached to an outer wall of the engine, no troublesome work is necessary for attaching the knocking sensor, and a small machining of the engine is only required for attaching the knocking sensor.

Further structural features of the misfire detecting device for a water jet propulsion watercraft configured in accordance with a preferred embodiment of the present invention include that the engine is preferably a multi-cylinder engine having a plurality of cylinders, the misfire detecting device is configured with ignition coils each of which is provided at the respective cylinder and having an ion current detecting circuit arranged to detect a value of an ion current generated in a combustion stroke at the respective cylinder, the misfire detecting device compares an occurrence timing of a combustion signal based upon the value of the ion current detected by each ignition coil and an occurrence timing of an ignition signal inputted to the igniting device, and the misfire detecting device determines that the misfire other than the misfire caused under the control by the misfire control device occurs when no combustion signal is generated in response to the ignition signal and ceases the fuel injection to the cylinder on which the misfire detecting device determines that the misfire other than the misfire caused under the control by the misfire control device occurs.

According to the above features, because the ignition coil having the ion current detecting circuit is provided to each exhaust conduit extending from the respective cylinder, the misfire detecting device can determine which cylinder has a misfire and can cease the fuel injection to the cylinder that has the abnormal misfire. As a result, unburnt gases are prevented from mingling with exhaust gases, and the exhaust gases can be kept in a good condition. Even if the exhaust conduit has a catalyst, after-fire is prevented from occurring, and the catalyst can be kept in a good condition. In addition, the misfire can be directly detected because each ignition coil detects a misfire by detecting an ion current generated in the combustion stroke at the respective cylinder. Whether the combustion occurs or not when the ignition is given can be surely and promptly determined. Thereby, accuracy of the misfire detection can be enhanced.

Further structural features of the misfire detecting device for a water jet propulsion watercraft configured in accordance with a preferred embodiment of the present invention include that the engine preferably is a multi-cylinder engine having a plurality of cylinders, a misfire ratio determining device is arranged to determine how many times the misfire other than the misfire caused by a control operation performed by the misfire control device occurs within a predetermined period of time, and the misfire control device, when a misfire ratio determined by the misfire ratio determining device is equal to or greater than a predetermined misfire ratio reference value, ceases the fuel injection to the cylinder where the misfire whose misfire ratio is equal to or greater than a predetermined misfire ratio reference value occurs.

According to the above features, because, when the misfire ratio is equal to or greater than the predetermined misfire ratio reference value, the misfire control device ceases the fuel injection to the cylinder where the misfire whose misfire ratio is equal to or greater than the predetermined misfire ratio reference value occurs, a relatively light abnormal misfire does not require any suspension of the fuel injection. As a result, the engine does not need to frequently repeat suspension and restart of the fuel injection. Generally, the operation feeling of the water jet propulsion watercraft can deteriorate when the suspension and the restart of the fuel injection are frequently repeated one after another. The operation feeling thus can be kept in a good condition according to these features. The misfire ratio determining device can be configured with the respective misfire detecting device described above and a timer provided to the control device.

Further structural features of the misfire detecting device for a water jet propulsion watercraft configured in accordance with a preferred embodiment of the present invention include that the engine preferably is a multi-cylinder engine having a plurality of cylinders, exhaust conduits extending from exhaust ports of the respective cylinders have catalysts, a catalyst temperature sensor is provided in close proximity to each catalyst in the respective exhaust conduit arranged to measure a temperature of the each catalyst, and the misfire control device, when a temperature of the catalyst detected by the catalyst temperature sensor is equal to or greater than a preset catalyst temperature reference value, ceases the fuel injection to the cylinder on which the misfire detecting device determines that the misfire other than the misfire caused by a control operation performed by the misfire control device occurs.

According to the above features, if the temperature of the catalyst detected by the catalyst temperature sensor is equal to or greater than a preset catalyst temperature reference value, the misfire control device ceases the fuel injection to the cylinder on which the misfire detecting device determines that the misfire other than the misfire caused under the control by the misfire control device occurs. Hence, if the temperature of the catalyst is less than a preset catalyst temperature reference value and the deterioration of the catalyst is not concerned, the engine does not need to frequently repeat the suspension and the restart of the fuel injection. The operation feeling of the water jet propulsion watercraft, which can deteriorate when the suspension and the restart of the fuel injection are frequently repeated one after another, can be prevented and kept in a good condition. It is preferable to set the catalyst temperature reference value at a temperature which is slightly lower than a temperature at which the catalyst can have much heat and can deteriorate. Alternatively, the misfire detecting device can be configured to only implement the indicating operation without ceasing the fuel injection if the catalyst temperature is equal to or greater than a catalyst activation temperature at which the catalyst functions in a good condition and is less than the catalyst temperature reference value.

Further structural features of the misfire detecting device for a water jet propulsion watercraft configured in accordance with a preferred embodiment of the present invention include that engine speed detecting device for detecting an engine speed preferably is provided to the water jet propulsion watercraft, and the predetermined misfire condition is a condition such that the engine speed detected by the engine speed detecting device is equal to or greater than a predetermined engine speed.

The engine of the water jet propulsion watercraft can be under an over-revolution condition when the jet pump is temporarily out of the water. Usually, a misfiring control is made under the condition to decrease the engine speed. Such a temporary over-revolution does not occur in an abnormal state but in a normal operation state. Therefore, if the misfire occurs under the control by the misfire control device, the occurrence of the misfire is not indicated to the operator. Thereby, the operator does not mistake the misfire caused by a control operation performed by the misfire control device for an abnormal misfire.

Further structural features of the misfire detecting device for a water jet propulsion watercraft configured in accordance with a preferred embodiment of the present invention include a cooling structure using water drawn by the jet pump as cooling water is a cooling water amount measuring device arranged to measure an amount of the cooling water or a temperature measuring device arranged to measure a temperature of the cooling water is provided to the water jet propulsion watercraft, and the predetermined misfire condition is a condition such that the amount of the cooling water measured by the cooling water amount measuring device is less than the predetermined minimum cooling water threshold amount or the temperature of the cooling water measured by the temperature measuring device is higher than the preset maximum cooling water threshold temperature.

In the water jet propulsion watercraft that takes in cooling water from outside, foreign matters can be mixed in the water to choke a flow path of the cooling water. Consequently, an amount of the cooling water that circulates in the flow path decreases to invite overheating of the engine. Also, a rise of the temperature of the cooling water can simply invite the overheating. Under those conditions, even if the misfire occurs under the control by the misfire control device, the occurrence of the misfire is not indicated to the operator. Thereby, the operator does not mistake the misfire caused by a control operation performed by the misfire control device for an abnormal misfire. Also, the operator can find that the misfire caused by a control operation performed by the misfire control device has invited the overheating. The operator thus can take necessary measures.

Further structural features of the misfire detecting device for a water jet propulsion watercraft configured in accordance with a preferred embodiment of the present invention include an overturn detecting device arranged to detect that the water jet propulsion watercraft overturns, and the predetermined misfire condition is a condition such that the overturn detecting device detects an overturn of the water jet propulsion watercraft. If the water jet propulsion watercraft overturns, the engine ceases to operate to prevent water from entering the engine from the flow path of the cooling water. Under those conditions, it is considered that the operator is away from the water jet propulsion watercraft; therefore, it is possible to avoid unnecessary information to be given to the operator by not informing the operator of the occurrence of the misfire even if the misfire occurs due to a control operation performed by the misfire control device.

Further structural features of the misfire detecting device for a water jet propulsion watercraft configured in accordance with a preferred embodiment of the present invention include an oil pressure measuring device arranged to measure a pressure of lubricant oil lubricating the engine, and the predetermined misfire condition is a condition such that the pressure of the lubricant oil measured by the oil pressure measuring device is less than the predetermined minimum oil pressure threshold amount. Even if the misfire occurs under the control by the misfire control device when the pressure of the lubricant oil measured by the oil pressure measuring device is less than the predetermined minimum oil pressure threshold amount, the occurrence of the misfire is not indicated to the operator. Thereby, the operator can find that the misfire is not abnormal but is caused by a reduction of pressure, and thus can take necessary measures.

Further structural features of the misfire detecting device for a water jet propulsion watercraft configured in accordance with a preferred embodiment of the present invention include an engine speed detecting device arranged to detect an engine speed and throttle valve opening detecting device arranged to detect an opening of a throttle valve provided to the engine, and the predetermined misfire condition is a condition such that the engine speed detected by the engine speed detecting device is less than the predetermined minimum engine speed threshold amount and the opening of the throttle valve detected by the throttle valve opening detecting device is less than the predetermined minimum throttle valve opening threshold amount.

According to the above features, normally, the misfire is caused by a control operation performed by the misfire control device even when the engine speed is less than the predetermined minimum engine speed threshold amount and the opening of the throttle valve is less than the predetermined minimum throttle valve opening threshold amount, i.e., even when both the engine speed and the engine load are low. In this regard, by operating only one or some cylinders of multiple cylinders, the operator does not mistake the misfire in the low speed and low load condition of the engine for an abnormal misfire. Also, the fuel can be saved by operating only one or some cylinders of multiple cylinders in the low speed and low load condition of the engine.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Figure 1:
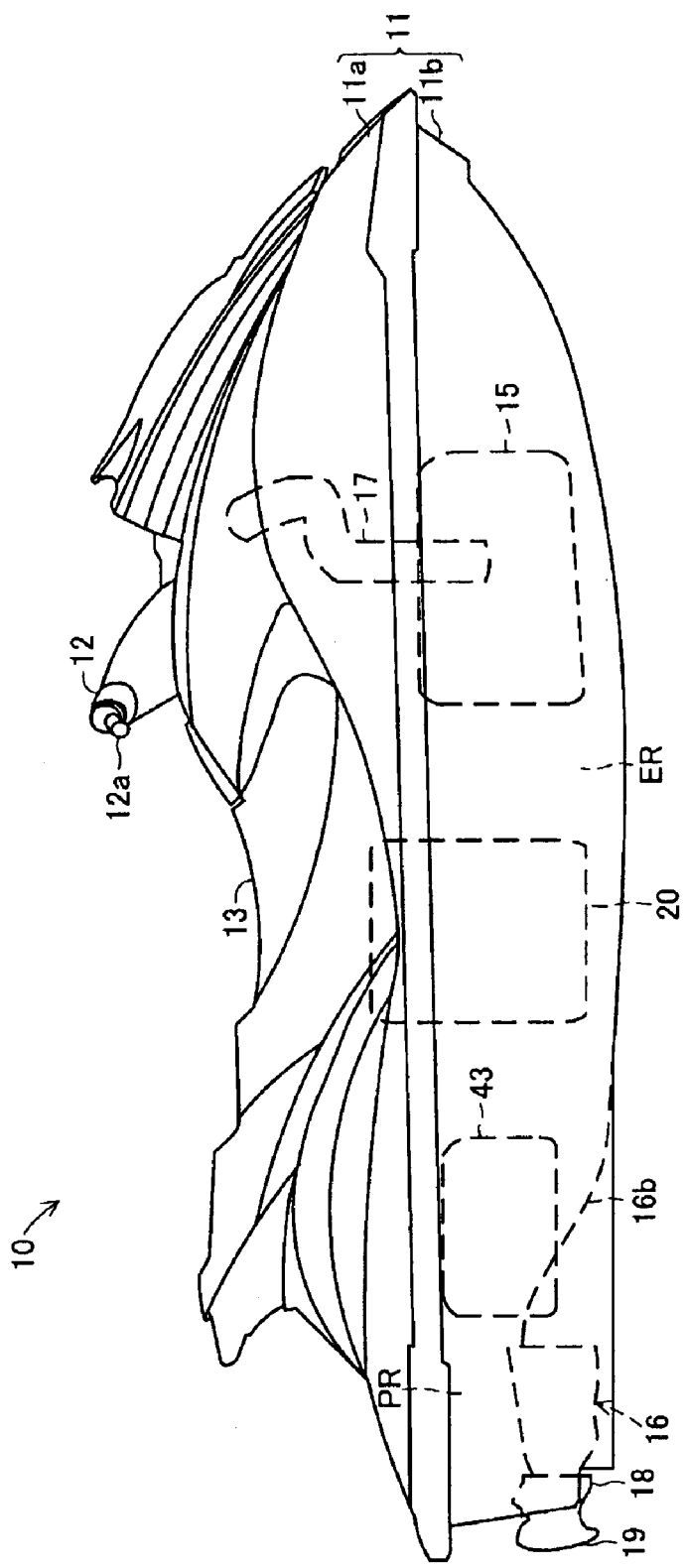
FIG. 1 is a side elevational view of a water jet propulsion watercraft having a misfire detecting device configured in accordance with a preferred embodiment of the present invention.
Figure 2:
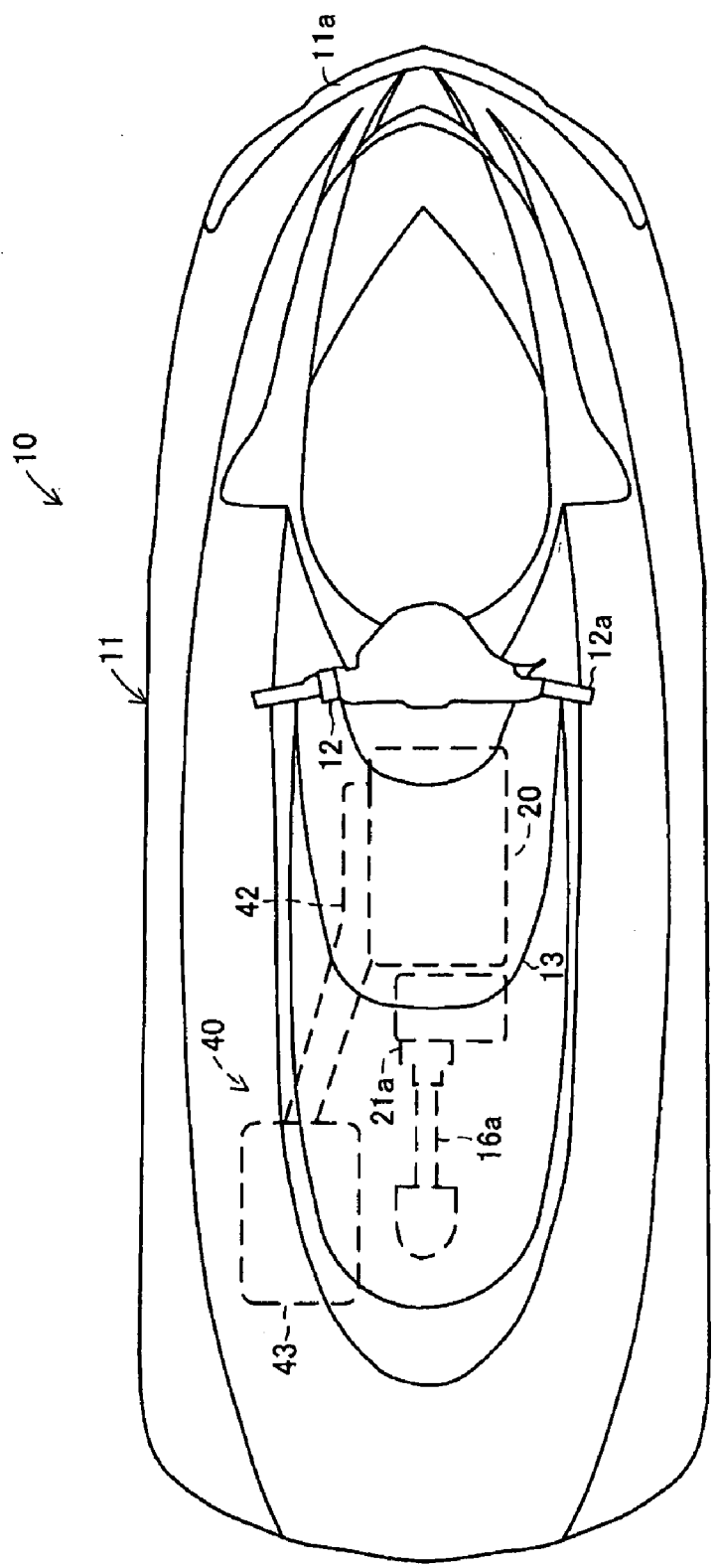
FIG. 2 is a plan view of a water jet propulsion watercraft in accordance with a preferred embodiment of the present invention.

With reference to drawings, a first preferred embodiment of the present invention will be described below. FIGS. 1 and 2 illustrate a water jet propulsion watercraft 10 having a misfire detecting device A (see FIG. 8) configured in accordance with the first preferred embodiment. The water jet propulsion watercraft 10 has a watercraft body 11 including a deck 11a and a hull 11b. A steering handle bar 12 is disposed at a portion located slightly more forward than a center portion of a top area of the watercraft body 11. A seat 13 is disposed in the center portion of the top area of the watercraft body 11. The steering handle bar 12 is attached to a top end portion of a steering shaft (not shown) provided to the watercraft body 11 to be pivotable about an axis of the steering shaft.

Figure 3:
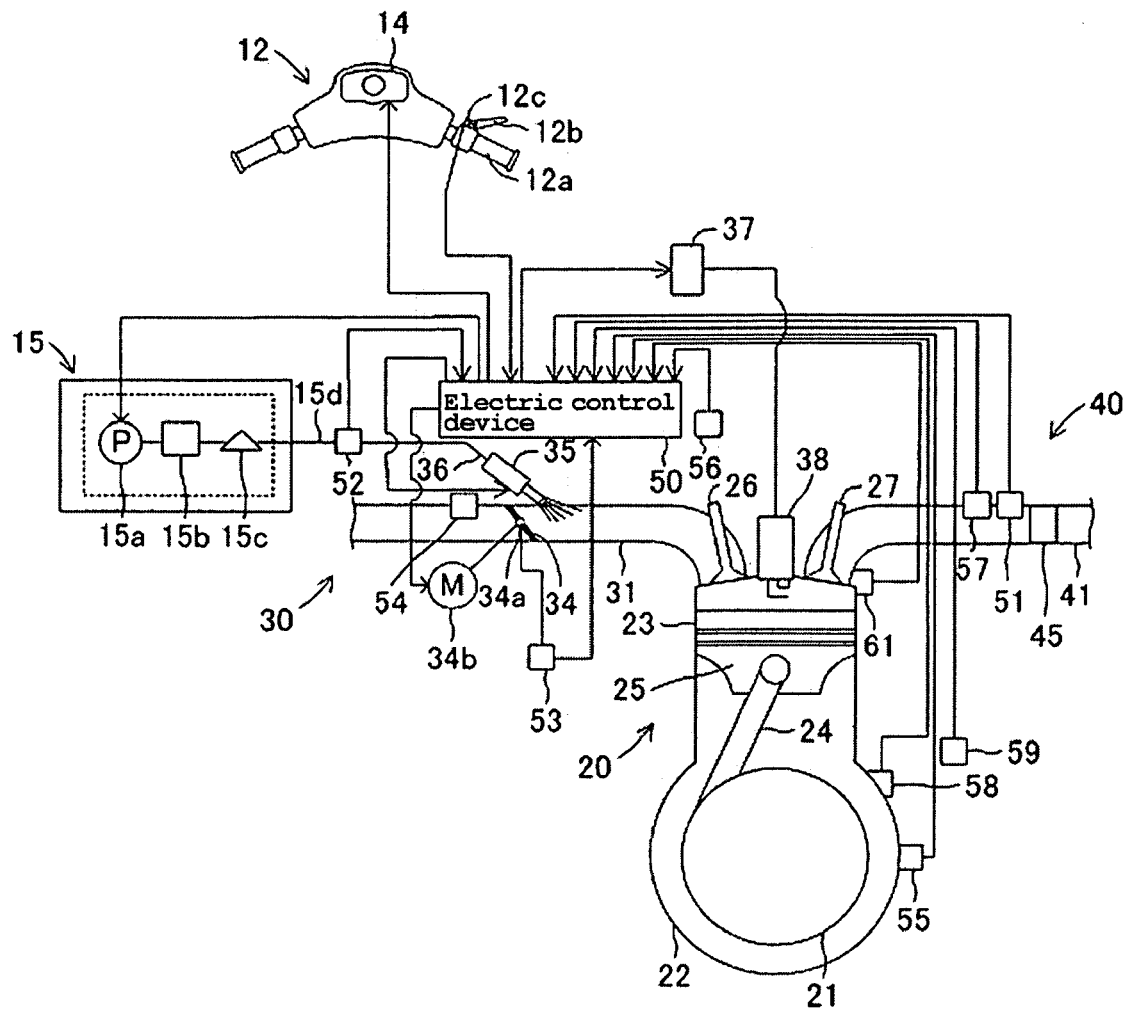
FIG. 3 is a schematic block diagram of the misfire detecting device in accordance with a preferred embodiment of the present invention.

As shown in FIG. 3, a throttle lever 12b is disposed in close proximity to a grip 12a on a right side (starboard side) of the steering handle bar 12. The throttle lever 12b is pivotable about a base portion thereof to approach the grip 12a by the operation of an operator. The throttle lever 12b thus is spaced apart from the grip 12a when released. An accelerator position sensor 12c is disposed at the base portion of the throttle lever 12b to detect an operational amount of the throttle lever 12b. A meter 14, which defines a misfire indicating device, is disposed at a center portion of the steering handle bar 12.

Figure 4:
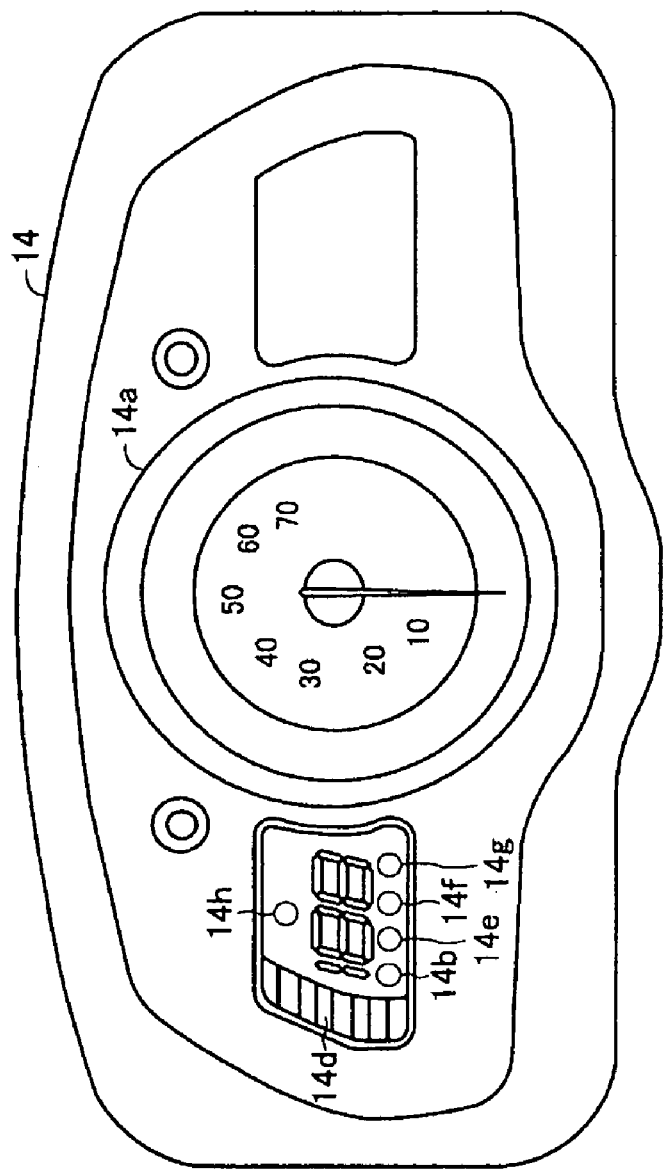
FIG. 4 is a front elevational view of a meter in accordance with a preferred embodiment of the present invention.

As shown in FIG. 4, the meter 14 has indicators including a speedometer 14a arranged to indicate a running speed of the water jet propulsion watercraft 10, a warning lamp 14b provided with LEDs, etc., and a buzzer 14c (see FIG. 8) or the like for alarming. The meter 14 also has a water temperature indicating section 14d arranged to indicate a temperature of engine cooling water, an engine abnormality indicating section 14e arranged to indicate that some abnormality occurs on an engine 20 which will be described below, an overheat indicating section 14f arranged to indicate that the engine 20 is in an overheat condition, an oil pressure decrease indicating section 14g arranged to indicate that a pressure of an engine oil decreases, a catalyst temperature indicating section 14h arranged to indicate a temperature of a catalyst 45 which will be described below and so forth.

The interior of the watercraft body 11 is divided into an engine compartment ER extending from a forward portion to a center portion, and a pump compartment PR defined in a rear portion. The engine compartment ER has a fuel tank 15, the engine 20, an intake device 30 including intake conduits 31, etc., an exhaust device 40 including an exhaust manifold 41 etc., and so forth. The pump compartment PR has a propulsion unit 16 including a jet pump, etc., and so forth. An air duct 17 is disposed in a front portion of the engine compartment ER to introduce ambient air into the engine compartment ER. The air duct 17 extends vertically from a top portion of the watercraft body 11 to a bottom portion of the engine compartment ER. The air duct 17 sucks ambient air in through a top end thereof and discharges the air out to the interior of the engine compartment ER through a bottom end thereof.

The fuel tank 15 preferably includes a generally rectangular shaped container. A bottom surface of the fuel tank 15 inclines so that a front portion thereof is higher than a rear portion thereof. The fuel tank 15 is disposed on the front side of the engine compartment ER and mounted via a plurality of vibration absorbing materials (not shown). A fuel pump module is disposed in the interior of the fuel tank 15 in such a manner that a top surface of the module is exposed to the outside from the fuel tank 15. The pump module contains a fuel pump 15a, a regulator 15b, a filter 15c, etc. Upon starting of an operation of the fuel pump 15a, fuel in the fuel tank 15 is suctioned into the fuel pump module. The regulator 15b adjusts a pressure of the fuel to be fixed, and then the filter 15c removes foreign matters from the fuel. Afterwards, the fuel is sent to the engine 20 through a fuel delivery conduit 15d, etc., extending from the fuel pump module.

Figure 5:
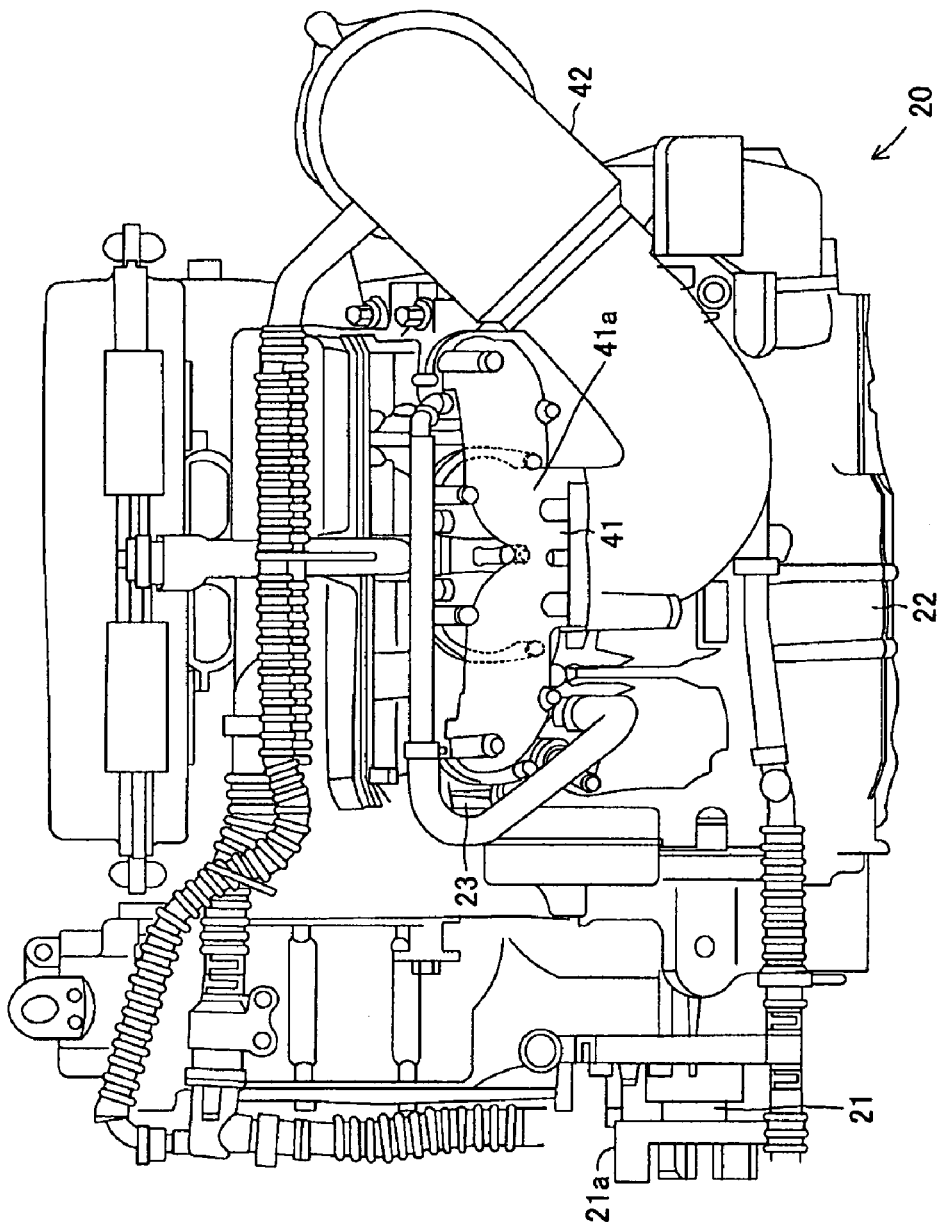
FIG. 5 is a side elevational view of an engine in accordance with a preferred embodiment of the present invention showing a lateral side on the starboard side.
Figure 6:
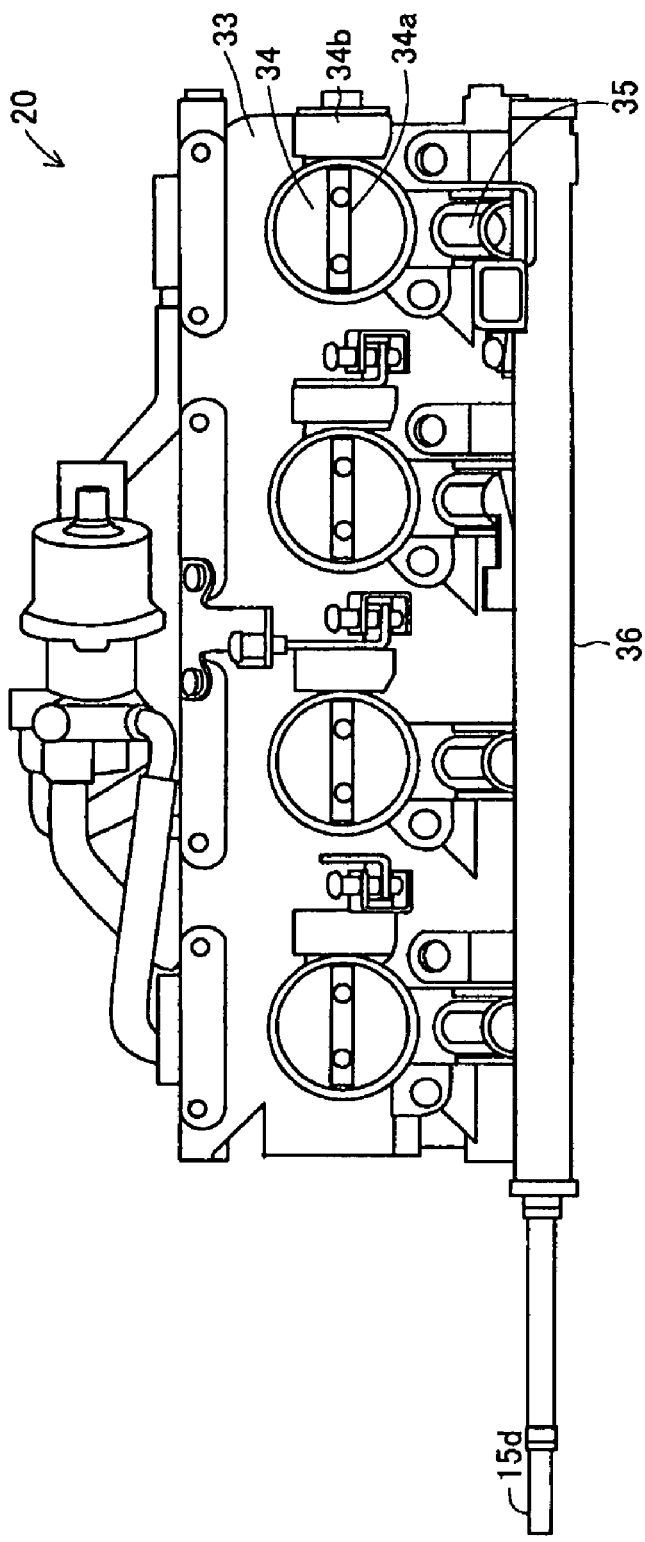
FIG. 6 is a plan view of throttle valves in accordance with a preferred embodiment of the present invention.
Figure 7:
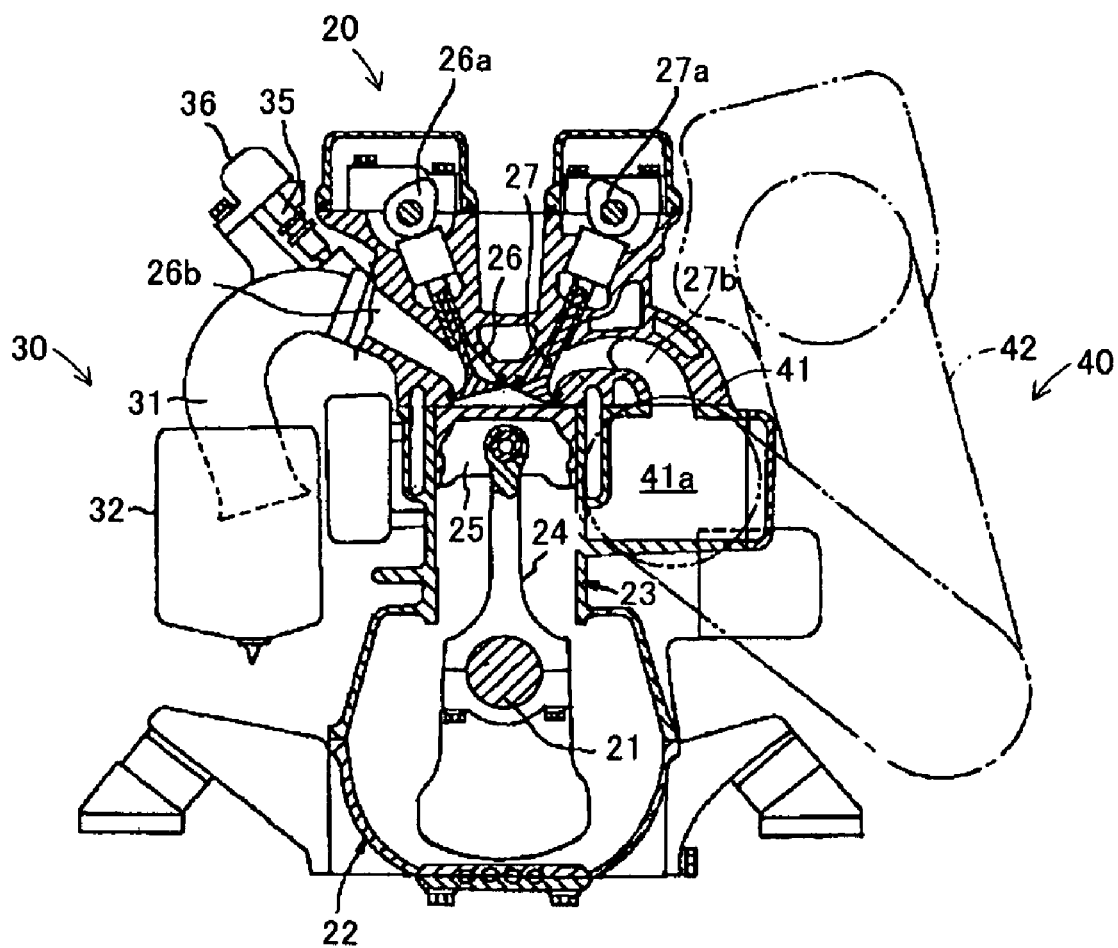
FIG. 7 is a cross-sectional view of an engine in accordance with a preferred embodiment of the present invention and other portions therearound.

The engine 20 is disposed on the rear side of the engine compartment ER (i.e., in a bottom center area of the watercraft body 11). As shown in FIGS. 5 and 7, the engine 20 is a preferably four-cylinder engine. A cylinder block 23 defining four cylinders extends from a top end of a crankcase 22 containing a crankshaft 21 therein. The cylinder block 23 and the crankcase 22 together define the exterior profile of a body of the engine 20. The cylinder block 23 contains pistons 25 connected to the crankshaft 21 through connecting rods 24 to be reciprocally movable. The reciprocal movement of the pistons 25 is transmitted to the crankshaft 21 and hence the crankshaft 21 rotates. The cylinder block 23 has four cylinders, each of which is provided with one intake valve 26 and one exhaust valve 27, i.e., a pair of valves. The intake valves 26 and the exhaust valves 27 are respectively driven by an intake camshaft 26a and an exhaust camshaft 27a. Both of the camshafts 26a, 27a are connected to the crankshaft 21 through a timing chain (not shown).

An intake port inlet 26b communicating with an intake port portion where the intake valve 26 of each cylinder is placed is connected to the intake device 30 including the intake conduits 31, etc. An exhaust port outlet 27b communicating with an exhaust port portion where the exhaust valve 27 of each cylinder is placed is connected to a collecting section 41a of an exhaust manifold 41 through four small exhaust conduits. The collecting section 41a is arranged at a lateral side of the cylinder block 23. The collecting section 41a is contiguous to a single large portion of the exhaust manifold 41 to extend downstream. The four small exhaust conduits connected to the respective outlets of the exhaust ports 27b, the exhaust manifold 41 and an exhaust pipe 42, which will be described below, together define the exhaust conduit according to a preferred embodiment of the present invention. Intake valves 26 open in an intake stroke to send air supplied from the intake device 30 to combustion chambers of the cylinder block 23 through the respective intake port inlets 26b, and close in an exhaust stroke. The exhaust valves 27 open in the exhaust stroke to send exhaust gases discharged from the combustion chambers of the cylinder block 23 through the respective exhaust port outlets 27b to the exhaust device 40 through the collecting section 41a.

The intake device 30 includes the intake conduits 31 connected to the cylinder block 23, an intake chamber 32 connected to upstream ends of the intake conduits 31, a throttle body 33 disposed at certain portions of the respective intake conduits 31, etc. The intake chamber 32 takes in the air outside of the watercraft through the air duct 17 and sends the air to the throttle bodies 33 through intake ducts (not shown). The throttle body 33 has throttle valves 34 which pivot to open or close the throttle body 33 to adjust a flow amount of the air supplied to the inside of the cylinder block 23. That is, each throttle valve 34 includes a disk body pivoting about an axis of a shaft portion 34a. The shaft portion 34a is rotatable by an operation of a motor 34b. Openings of the respective throttle valves 34 are adjusted when the operator operates the throttle lever 12b attached to the steering handle bar 12 to pivotally move.

Fuel is supplied to the engine 20 from the fuel tank 15 through a fuel supply device. The fuel supply device preferably includes the fuel pump 15a, injectors 35 working as the fuel injecting device, a fuel rail 36 and so forth. The fuel taken out from the fuel tank 15 by an operation of the fuel pump 15a is sprayed into the respective cylinders by the injectors 35. In this operation, the fuel is mixed with the air supplied from the intake device 30 to form a mixture and sent into the combustion chambers of the cylinder block 23. The engine 20 also has an ignition device including ignition coils 37 and ignition plugs 38. Each ignition coil 37 sends an electric current to the associated ignition plug 38 at ignition timing. Thereby, the ignition plug 38 sparks and ignites the mixture to burn. The burning of the mixture moves the pistons 25 reciprocally to rotate the crankshaft 21.

An impeller shaft 16a coupled with the crankshaft 21 through a coupling 21a extends from a rear portion of the engine 20 to the interior of the pump chamber PR located rearward. The impeller shaft 16a is coupled with an impeller disposed within the propulsion unit 16 that is located in the stern of the watercraft 11. The impeller shaft 16a transmits the rotational force of the crankshaft 21 generated by the operation of the engine 20 to the impeller to rotate the impeller. The rotation of the impeller generates the propulsion force of the water jet propulsion watercraft 10. Also, the propulsion unit 16 has a water introducing opening 16b which opens at a bottom portion of the watercraft body 11 and a water spouting opening (not shown) which opens at the stern. The rotation of the impeller introduces water through the water introducing opening 16b and spouts the water through the water spouting opening. Thereby, the watercraft body 11 obtains the propulsion force.

A tubular steering nozzle 18 is preferably mounted to the propulsion unit 16 in close proximity to the water spouting opening. A bore of a front end portion of the steering nozzle 18 is slightly large, while a bore of a rear end portion thereof is slightly small. A bowl-shaped reverse gate 19 is attached to the steering nozzle 18. Top and bottom portions of the front end portion of the steering nozzle 18 are supported by the propulsion unit 16 through a pivot shaft so that the rear end portion of the steering nozzle 18 is pivotable rightward and leftward. The steering nozzle 18 is connected to the steering handle bar 12 and pivots along with the operation of the steering handle bar 12. The reverse gate 19 pivots vertically relative to the steering nozzle 18 to direct the water jet propulsion watercraft 10 forward or backward.

The exhaust device 40 includes the exhaust manifold 41 provided with bent conduits connected to the engine 20, the exhaust pipe 42, a tank-shaped water-lock 43 connected to a rear end portion of the exhaust pipe 42, etc. The exhaust manifold 41 has portions extending slightly downward from the exhaust valve 27 sides of the respective cylinders of the engine 20 and merging at the collecting section 41a. A tip end portion of the manifold 41 is coupled with the exhaust pipe 42. The exhaust pipe 42 once extends obliquely upward forward from a coupling portion thereof to the exhaust manifold 41. The exhaust pipe 42 extends from the starboard side to the portside in front of the engine 20 and then passing through an area existing in an obliquely upward location of the engine 20. Afterwards, the exhaust pipe 42 extends rearward.

A rear end portion of the exhaust pipe 42 is coupled with a front portion of the water-lock 43. Another exhaust pipe (not shown) extends rearward from a top surface of a rear portion of the water-lock 43. An end of an upstream portion of this exhaust pipe communicates with an upper portion of the water-lock 43, while a downstream portion extends once upward and then downward rearward. An end of the downstream portion opens to a lower portion of a rear end of the watercraft body 11. Although not shown, the exhaust manifold 41 and an upstream portion of the exhaust pipe 42 are provided with a dual conduit. An internal portion of the dual conduit defines an exhaust gas passage through which exhaust gases discharged from the engine 20 pass, while an external portion of the dual conduit defines a cooling water passage through which cooling water that has cooled the engine 20, etc., passes.

The cooling water passage merges with the exhaust gas passage at the downstream portion of the exhaust pipe 42. The exhaust gases passing through the exhaust gas passage and the cooling water passing through the cooling water passage are mixed with each other at this merging portion. The cooling water passing through the cooling water passage includes the sea water, etc., taken in through the rear portion of the bottom portion of the watercraft 11. The cooling water passes through cooling water paths disposed within the watercraft body 11 to cool respective portions of the engine 20, etc. Afterwards, the cooling water passes through the cooling water passage to be discharged outside together with the exhaust gases.

The cooling water passage defined by the exhaust manifold 41 and the exhaust pipe 42 and the cooling water paths arranged to cool the engine 20 together define the cooling structure. The catalyst 45 is disposed at a certain portion in the exhaust gas passage of each exhaust pipe 42. Each catalyst 45 is arranged with a honeycomb-shaped base member whose surface is coated with platinum to purify the exhaust gases passing through the associated exhaust pipe 42. As thus constructed, the exhaust device 40 discharges exhaust gases to the outside under the condition that the sea water, etc., located outside is prevented from entering the side of the engine 20.

Figure 8:
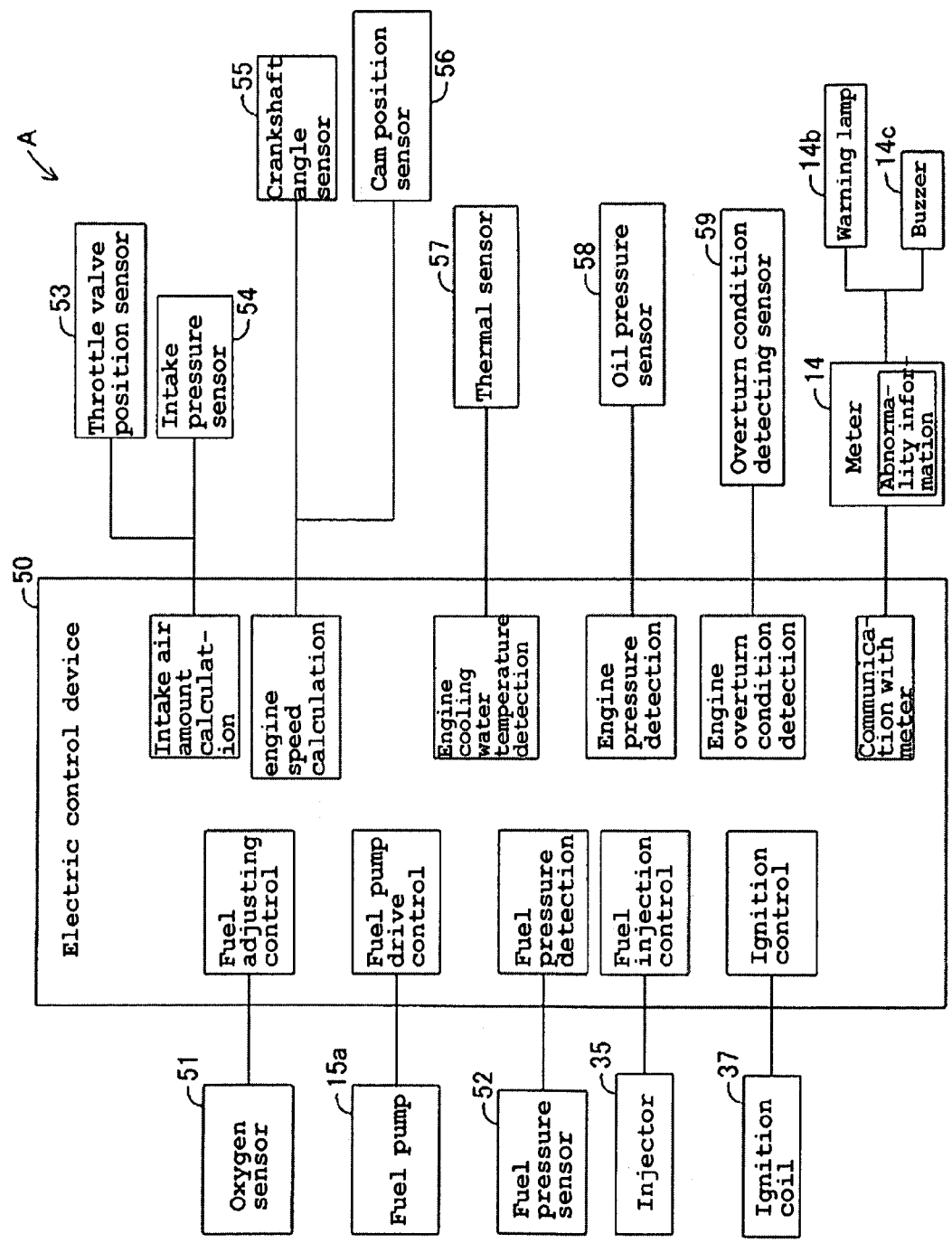
FIG. 8 is a block diagram of the major portion of a misfire detecting device configured in accordance with a first preferred embodiment of the present invention.

The misfire detecting device A configured in accordance with this preferred embodiment includes, other than those devices, units and members described above, an electric control device 50 arranged to control the devices, units and members provided to the water jet propulsion watercraft 10 and sensors such as an oxygen sensor 51, a fuel pressure sensor 52, a throttle valve position sensor 53, an intake pressure sensor 54, a crankshaft angle sensor 55, a cam position sensor 56, a thermal sensor 57, an oil pressure sensor 58, a turnover condition detecting sensor 59 and knocking sensors 61, as shown in FIG. 8. The water jet propulsion watercraft 10 also preferably has various devices, units and members including various switches such as a start switch, etc., and other components which are necessary to run the water jet propulsion watercraft 10.

The electric control device 50 includes a CPU, ROM, RAM, a timer and so forth. The CPU executes various controls and calculations shown in the block of the electric control device 50 of FIG. 8 based upon various programs stored in the ROM, data stored in the RAM, etc. Also, the electric control device 50 gathers results detected by the various sensors, etc., as data. The oxygen sensor 51 preferably defines the air-fuel ratio detecting device. The oxygen sensor 51 is disposed in one of the exhaust gas passages of exhaust gas manifold 41 to detect an oxygen density in the exhaust gases passing through the exhaust gas passage of exhaust gas manifold 41. The electric control device 50 implements, based upon detection values of the oxygen sensor 51, a fuel adjusting control in which a density of the mixture made of the fuel and the air injected toward the combustion chambers of the cylinder block 23 from the injectors 35 and an injection amount of the mixture are adjusted.

The fuel pressure sensor 52 is disposed in the fuel delivery conduit 15d to detect a pressure of the fuel flowing through the fuel delivery conduit 15d. The electric control device 50 controls the fuel pump 15a based upon detection values of the fuel pressure sensor 52 so that the fuel pressure is kept at an appropriate value. The throttle valve position sensor 53 preferably defines the throttle valve opening detecting device according to a preferred embodiment of the present invention. The throttle valve position sensor 53 is attached to the shaft portion 34a of the throttle valves 34 to detect openings of the throttle valves 34 from a pivot angle of the shaft portion 34a. As described above, the openings of the throttle valves 34 are adjusted by the operation to pivotally move the throttle lever 12b. Thus, actual openings of the throttle valves 34 relative to the operational amount of the throttle lever 12b detected by the accelerator position sensor 12c can be found from the detection values of the throttle valve position sensor 53.

The intake pressure sensor 54 is disposed at one of the intake conduits 31 to detect a pressure of the air passing through the intake conduit 31. The electric control device 50 calculates an intake air amount using the detection value of the throttle valve position sensor 53 and the detection value of the intake pressure sensor 54. The intake air amount obtained through the calculation is used for the fuel adjusting control. The crankshaft angle sensor 55 is disposed in close proximity to the crankshaft 21 to detect a rotational angle of the crankshaft 21. The cam position sensor 56 is disposed in close proximity to the intake camshaft 26a or the exhaust camshaft 27a to detect a rotational angle of the intake camshaft 26a or the exhaust camshaft 27a. The crankshaft angle sensor 55 and the cam position sensor 56 define the engine speed fluctuation detecting device and the engine speed detecting device, respectively.

The electric control device 50 calculates an engine speed using the detection value of the crankshaft angle sensor 55 and the detection value of the cam position sensor 56. The engine speed value obtained through the calculation is used for determining whether the engine 20 is in an over-revolution condition or not, i.e., whether the rotation of the engine 20 is in an excessively high speed range or not. The thermal sensor 57 preferably defines the temperature measuring device according to a preferred embodiment of the present invention. The thermal sensor 57 is disposed in close proximity to the cooling water passage of the exhaust manifold 41 to detect a temperature of the cooling water passing through the cooling water passage of the exhaust manifold 41. This detection value is used for determining whether the engine 20 is in an overheating condition or not. If the overheating is determined, the overheating indicating section 14f of the meter 14 is turned on.

The oil pressure sensor 58 preferably defines the oil pressure measuring device according to a preferred embodiment of the present invention. The oil pressure sensor 58 is disposed within the crankcase 22 of the engine 20 to detect a pressure of the engine oil flowing through a lubricant oil flow path defined within the crankcase 22. The turnover condition detecting sensor 59 defines the turnover detecting device. The turnover condition detecting sensor 59 is disposed in close proximity to the engine 20 to detect a turnover condition of the water jet propulsion watercraft 10 when the watercraft 10 overturns. The knocking sensors 61 preferably define the vibration detecting device according to a preferred embodiment of the present invention and are disposed in the respective cylinders. The knocking sensors 61 detect an abnormality in combustion of respective cylinders by vibration.

The electric control device 50 controls the ignition coils 37 to cease the ignitions of the mixtures by the ignition plugs 38 if the electric control device 50 determines at least one of the over-revolution condition, the overheating condition, the condition in which the oil pressure of the engine oil becomes equal to or less than a predetermined value, the turnover condition or an idling condition. On this occasion, the electric control device 50 also ceases the fuel injection to the engine 20 from the injectors 35. When some unfavorable matters such as an abnormality in speed fluctuation of the engine 20 arise, a misfire can occur notwithstanding the control by the electric control device 50.

Figure 9:
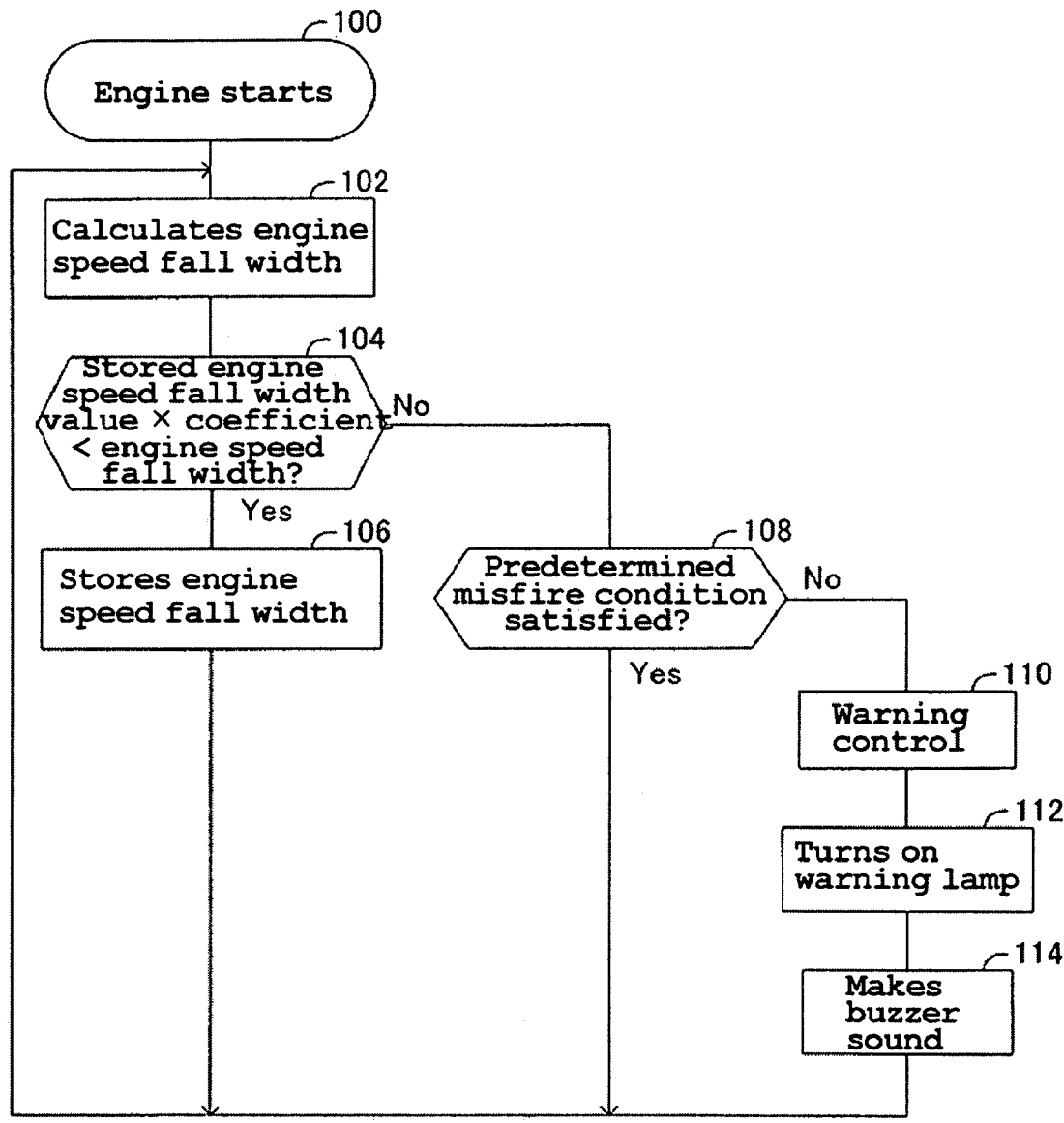
FIG. 9 is a flowchart of a program for providing an indication of an abnormal misfire based upon an engine speed decrease width in accordance with a preferred embodiment of the present invention.
Figure 10:
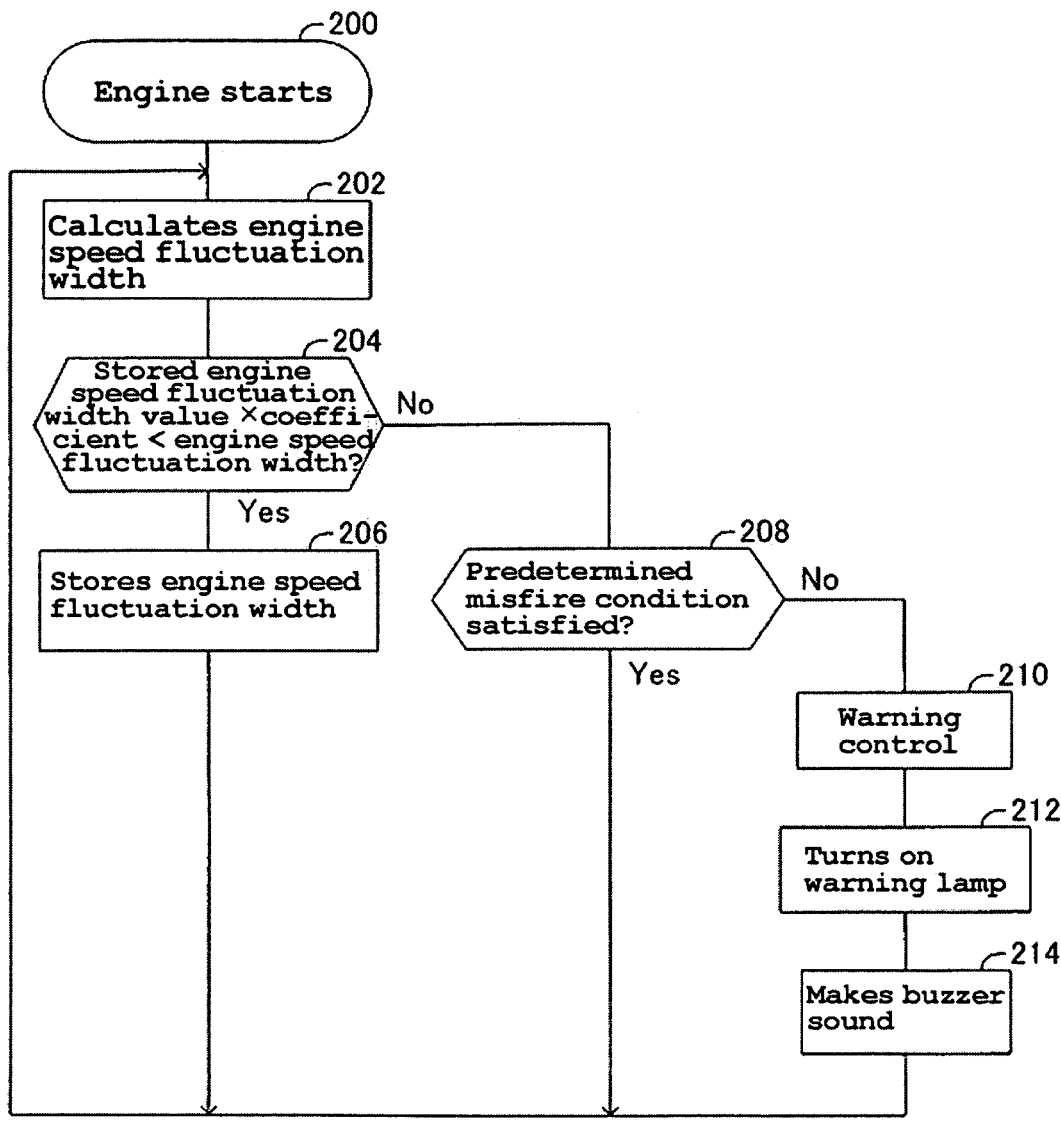
FIG. 10 is a flowchart of a program for providing an indication of the abnormal misfire based upon an engine speed fluctuation width in accordance with a preferred embodiment of the present invention.

The meter 14 intermittently turns on the warning lamp 14*b* and makes the buzzer 14*c* sound based upon data indicating the abnormality sent from the electric control device 50 when the abnormality gives rise to the misfire. Programs shown in FIGS. 9 and 10 are written in the ROM of the electric control device 50. The programs are used for intermittently turning on the warning lamp 14*b* and making the buzzer 14*c* sound when the abnormal misfire occurs. Additionally, the electric control device 50 defines the control device such as the fuel injection control device, the misfire control device and so forth.

In order to run the water jet propulsion watercraft 10 as thus constructed, first, the start switch is turned on. Thereby, the engine 20 starts and the water jet propulsion watercraft 10 is in a running condition. The operator seated on the seat 13 operates the steering handle 12 and also operates the throttle lever 12*b;* thereby, the water jet propulsion watercraft 10 starts running in a certain direction and at a certain speed corresponding to the respective operations. On this occasion, the engine 20 operates, under the control by the electric control device 50, with the openings of the throttle valves 34 given in response to the operational amount of the throttle lever 12*b* detected by the accelerator position sensor 12*c*. Also, if some abnormal misfires occur in the engine 20 when the water jet propulsion watercraft 10 runs, a warning is provided in accordance with the programs shown in FIGS. 9 and 10.

First, the program shown in FIG. 9 starts at the step 100. Upon starting of the engine 20, the program goes to the step 102 to implement a process in which a decrease width of the engine speed is calculated. This process is executed as follows: previously, engine speeds per respective throttle valve openings are calculated based upon detection values of the crankshaft angle sensor 55, detection values of the cam position sensor 56 and detection values of the throttle valve position sensor 53; based upon the multiple values of the engine speeds obtained through the calculation, a decrease width per unit time of the engine speed under a normal condition is calculated; and a decrease width of the engine speed at this time relative to the decrease width per unit time is calculated.

Next, at the step 104, it is determined whether the engine speed decrease width obtained in the process of the step 102 is larger or smaller than a product made by the multiplication of a stored engine speed decrease width that is stored previously and a predetermined coefficient. The stored engine speed decrease width value is the decrease width per unit time of the engine speed described above. The coefficient is an optional value decided in consideration of variations given in such a manner that the product with the stored engine speed decrease width value can be a value whereby a misfire is determined to exist. At the step 104, if "Yes" is determined because the engine speed decrease width is smaller than the product made by the multiplication of the stored engine speed decrease width value and the coefficient, the program goes to the step 106.

At the step 106, the stored engine speed decrease width value is renewed. In this process, the calculation value obtained at the step 102 is added as one of multiple calculation values for calculating the stored engine speed decrease width value and the oldest calculation value is eliminated from the multiple calculation values to obtain a new stored engine speed decrease width value. The new stored engine speed decrease width value is stored in the RAM. Then, the program returns to the step 102. Afterwards, as long as the determination "Yes" is provided at the step 104, the steps 102, 104 and 106 are repeated.

If "No" is determined at the step 104 because the engine speed decrease width is larger than the product made by the multiplication of the stored engine speed decrease width value and the coefficient, i.e., the engine speed abruptly decreases, the program goes to the step 108. At the step 108, it is determined whether any one of detection values of the throttle valve position sensor 53, the intake pressure sensor 54, the crankshaft angle sensor 55, the cam position sensor 56, the thermal sensor 57, the oil pressure sensor 58 and the turnover condition detecting sensor 59 satisfies the misfire condition or not, i.e., whether any one of the over-revolution condition, the overheat condition, the oil pressure decrease condition, the turnover condition and the idling condition arises or not.

If one of the detecting values satisfies the misfire condition, the misfire is caused under the control by the electric control device 50 even though the misfire occurs in the engine 20. Hence, the determination "Yes" is made at the step 108, and the program returns to the step 102. Afterwards, as long as the determination "Yes" is provided at the step 108, the steps 102, 104 and 108 are repeated. Under this condition, a predetermined indicator of the meter 14 for indicating a specific cause of the misfire is turned on. The stored engine speed decrease width value is not renewed to the engine speed decrease width read at the step 102. In other words, the stored engine speed decrease width value stored at the step 106 in the last execution of the program is still stored.

If the engine speed decrease width is larger than the product made by the multiplication of the stored engine speed decrease width value and the coefficient, none of the detecting values satisfies the misfire condition and "No" is determined at the step 108, the program goes to the step 110. At the step 110, warning is given, i.e., a command data is transmitted to the meter 14 from the electric control device 50. Thus, the warning lamp 14*b* blinks at the step 112. That is, the warning lamp 14*b* is intermittently turned on and off. The buzzer 14*c* also sounds at the step 114. Next, the program returns to the step 102. Afterwards, the steps 102-114 are repeated until the operation of the engine 20 is stopped.

In the program shown in FIG. 10, when a misfire occurs, it is determined, not based upon the engine speed decrease width but on an engine speed fluctuation width, whether the misfire occurs under the control by the electric control device 50 or occurs due to any abnormality. Accordingly, at the step 202, a process in which the engine speed fluctuation width is calculated is implemented. This process is executed as follows: previously, engine speeds are calculated one after another based upon detection values of the crankshaft angle sensor 55 and detection values of the cam position sensor 56; based upon the multiple values of the engine speeds obtained through the calculation, a fluctuation width per unit time of the engine speed is calculated; and a fluctuation width of the engine speed at this time relative to the fluctuation width per unit time is calculated. In this alternative, detection values of the throttle valve position sensor 53 are not considered. However, as in the program shown in FIG. 9 and as described above, the engine speed fluctuation width can be calculated by adding the detection values of the throttle valve position sensor 53.

Next, at the step 204, it is determined whether the engine speed fluctuation width obtained in the process of the step 202 is larger or smaller than a product made by the multiplication of a stored engine speed fluctuation width value that is stored previously and a predetermined coefficient. The stored engine speed fluctuation width value is the fluctuation width per unit time of the engine speed described above. The coefficient is an optional value decided in consideration of variations given in such a manner that the product with the stored engine speed fluctuation width value can be a value whereby a misfire is determined to exist. At the step 204, if "Yes" is determined because the engine speed fluctuation width is smaller than the product made by the multiplication of the stored engine speed fluctuation width value and the coefficient, the program goes to the step 206.

At the step 206, the stored engine speed fluctuation width value is renewed. In this process, the calculation value obtained at the step 202 is added as one of multiple calculation values for calculating the stored engine speed fluctuation width value and the oldest calculation value is eliminated from the multiple calculation values to obtain a new stored engine speed fluctuation width value. The new stored engine speed fluctuation width value is stored in the RAM. Then, the program returns to the step 202. Also, at the steps 208, 210, 212 and 214, the same processes as the processes implemented at the steps 108, 110, 112 and 114 described above are implemented.

As thus described, in the misfire detecting device A for the water jet propulsion watercraft 10 configured in accordance with this preferred embodiment, the warning lamp 14*b* blinks and the buzzer 14*c* sounds when some misfire occurs in the engine 20. If, however, the misfire is caused under the control by the electric control device 50, neither the warning lamp 14*b* blinks nor the buzzer 14*c* sounds. That is, the determination "Yes" made at the step 108 of FIG. 9 or at the step 208 of FIG. 10 defines the inhibiting indicating device. Therefore, the operator can reliably and accurately determine that the abnormal misfire occurs and does not mistake the misfire caused by a control operation performed by the control device for a misfire caused by an abnormality of the engine 20.

The fuel injection by the injectors 35 and the ignition of the fuel by the ignition plugs 38 are ceased when the misfire caused under the control performed by the electric control device 50 occurs. Thus, even though the misfire caused under the control occurs, no unburnt gases remain and no after-fire occurs in the exhaust pipe 42. Also, in this preferred embodiment, the misfire detecting device is arranged with the crankshaft angle sensor 55, a cam position sensor 56 and the throttle valve position sensor 53 all of which are normally provided to the water jet propulsion watercraft. Therefore, no additional parts are necessary for the misfire detecting device A. In addition, cost reduction, engine downsizing and weight reduction can be made.

Second Preferred Embodiment

Figure 11:
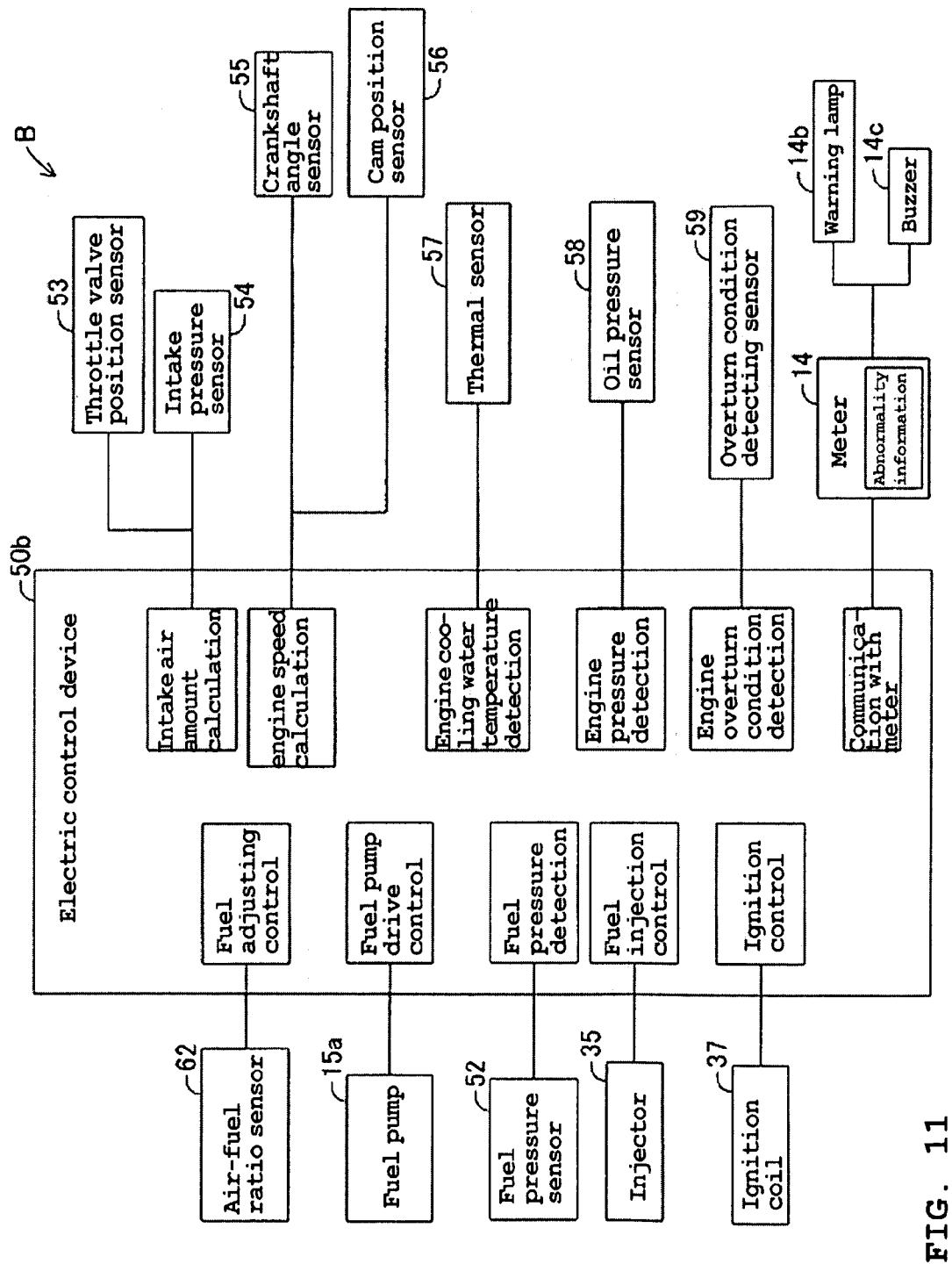
FIG. 11 is a block diagram of the major portion of the misfire detecting device configured in accordance with a second preferred embodiment of the present invention.

FIG. 11 illustrates a misfire detecting device B configured in accordance with a second preferred embodiment of the present invention. In this misfire detecting device B, an air-fuel ratio sensor 62 replaces the oxygen sensor 51 used in the misfire detecting device A described above. The air-fuel ratio sensor 62 can be disposed in each exhaust conduit extending from the respective cylinder (i.e., each portion located upstream of the collecting section 41*a*). Alternatively, the air-fuel ratio sensor 62 can be placed at the exhaust gas passage of the exhaust manifold 41 where the oxygen sensor 51 is placed in the misfire detecting device A. In this alternative, the air-fuel ratio sensor 62 detects an air-fuel ratio which is a mass ratio between the fuel and the air from the exhaust gases passing through the exhaust gas passage of the exhaust manifold 41. The air-fuel ratio sensor 62 can be defined by a sensor made of a zirconium solid electrolyte tube having electrodes both the outside and inside of which are coated with platinum. In this air-fuel ratio sensor 62, oxygen ions flow from the side where an oxygen partial pressure is high to the side where the oxygen partial pressure is low; thereby, an electromotive force that is proportional to a logarithm of oxygen partial pressure ratio between the electrodes is generated.

A voltage value caused by the electromotive force is measured, and it is determined whether the voltage value is in a normal range or not. Thereby, the fluctuation of the air-fuel ratio can be detected, and whether any misfire occurs or not can be determined. The electric control device 50*b* implements, based upon detection values of the air-fuel ratio sensor 62, the fuel adjusting control in which a density of the mixture made of the fuel and the air injected toward the combustion chambers of the cylinder block 23 from the injectors 35 and an injection amount of the mixture are adjusted. Other portions of the misfire detecting device B and of the water jet propulsion watercraft having the misfire detecting device B are the same as those of the misfire detecting device A and of the water jet propulsion watercraft 10 having the misfire detecting device A. Accordingly, the same numerals and symbols are assigned to the same portions and further descriptions are omitted.

Figure 12:
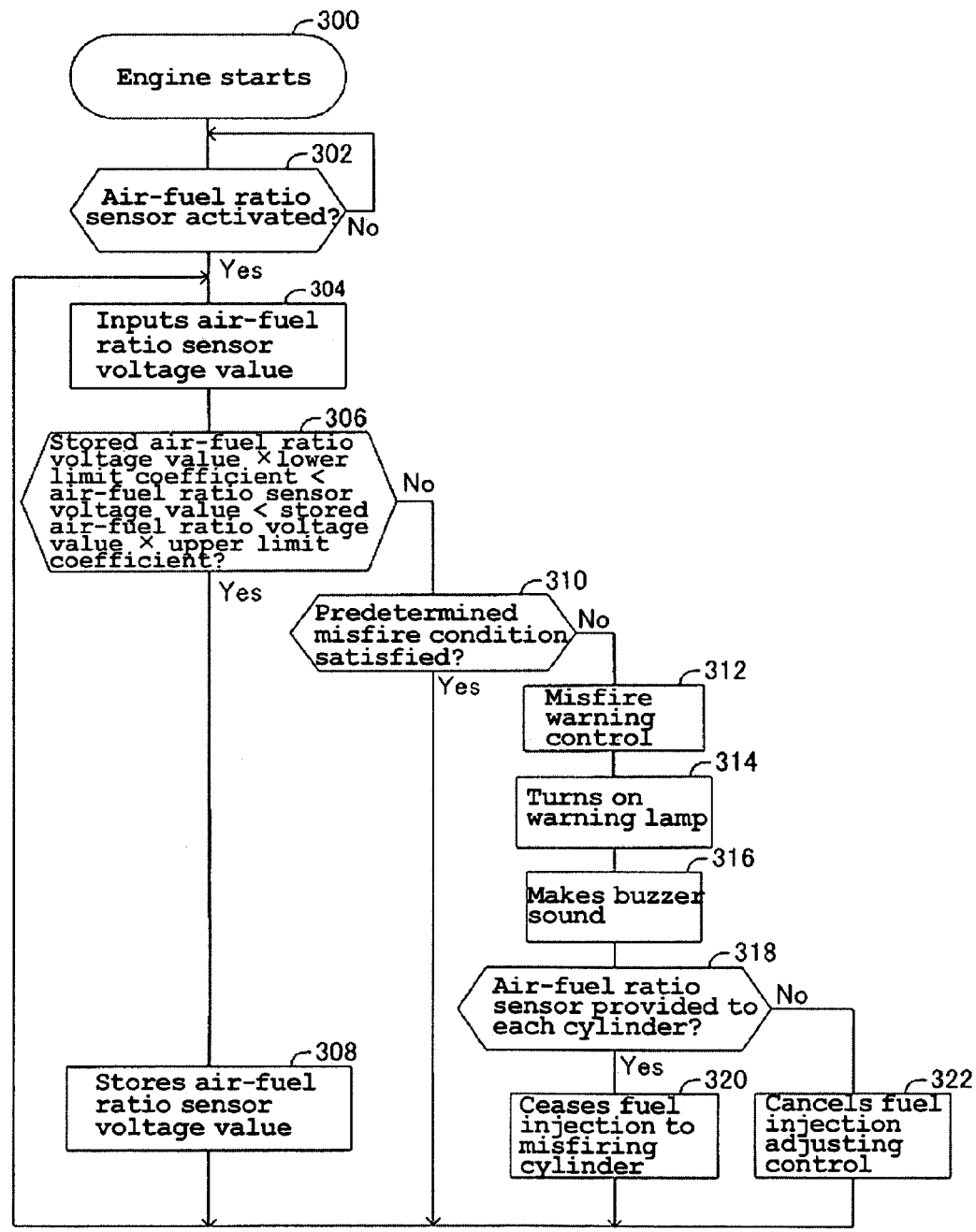
FIG. 12 is a flowchart of a program for providing an indication of the abnormal misfire based upon an air-fuel ratio sensor voltage value in accordance with a preferred embodiment of the present invention.

If some abnormal misfires occur in the engine 20 when the water jet propulsion watercraft 10 having the misfire detecting device B runs, a warning is provided in accordance with the program shown in FIG. 12. The program starts at the step 300. Upon starting of the engine 20, the program goes to the step 302 to determine whether the air-fuel ratio sensor 62 is activated or not. The air-fuel ratio sensor 62 is preferably heated up to a predetermined temperature because detection accuracy of the air-fuel sensor 62 is inappropriate when the temperature of the sensor 62 is below the predetermined temperature. Hence, at this step 300, it is determined whether the temperature of the air-fuel ratio sensor 62 reaches the predetermined temperature and the condition is stable or not.

If, at the step 302, "No" is determined, the program returns to the step 302 to repeat it. If "Yes" is determined at the step 302 because the temperature of the air-fuel ratio sensor 62 reaches the predetermined temperature, the program goes to the step 304 to read a data of air-fuel ratio sensor voltage value detected by the air-fuel ratio sensor 62. Next, at the step 306, it is determined whether the air-fuel ratio sensor voltage value obtained in the process of the step 304 is larger than a product made by the multiplication of a stored air-fuel ratio sensor voltage value that is stored previously and a lower limit coefficient and smaller than a product made by the multiplication of the stored air-fuel ratio sensor voltage value and a upper limit coefficient or not.

The stored air-fuel ratio sensor voltage value is a value corresponding to each engine speed, each throttle valve opening and each intake pressure, calculated based upon detection values of the crankshaft angle sensor 55, detection values of the cam position sensor 56, detection values of the throttle valve position sensor 53 and detection values of the intake pressure sensor 54 and then stored. The lower limit coefficient is a value whereby a product resulting from the multiplication with the stored air-fuel ratio sensor voltage value is smaller than a normal range of the air-fuel ratio, and an optional value decided in consideration of variations. The upper limit coefficient is a value whereby a product resulting from the multiplication with the stored air-fuel ratio sensor voltage value is off to be larger than a normal range of the air-fuel ratio, and an optional value decided in consideration of variations.

If "Yes" is determined at the step 306 because the air-fuel ratio sensor voltage value is larger than the product made by the multiplication of the stored air-fuel ratio sensor voltage value and the lower limit coefficient and smaller than the product made by the multiplication of the stored air-fuel ratio sensor voltage value and the upper limit coefficient, the program goes to the step 308. At the step 308, the stored air-fuel ratio sensor voltage value is renewed. In this process, the stored air-fuel ratio sensor voltage value read at the step 304 replaces the stored air-fuel ratio sensor voltage value relative to the predetermined engine speed, throttle valve opening or intake pressure. Then, the program returns to the step 304. Afterwards, as long as the determination "Yes" is provided at the step 306, the steps 304, 306 and 308 are repeated.

If "No" is determined at the step 306 because the air-fuel ratio sensor voltage value is smaller than the product made by the multiplication of the stored air-fuel ratio sensor voltage value and the lower limit coefficient, or the air-fuel ratio sensor voltage value is larger than the product made by the multiplication of the stored air-fuel ratio sensor voltage value and the upper limit coefficient, the program goes to the step 310. At the step 310, it is determined whether any one of detection values of the throttle valve position sensor 53, the intake pressure sensor 54, the crankshaft angle sensor 55, the cam position sensor 56, the thermal sensor 57, the oil pressure sensor 58 and the turnover condition detecting sensor 59 satisfies the misfire condition or not, i.e., whether any one of the over-revolution condition, the overheating condition, the oil pressure decrease condition, the turnover condition and the idling condition arises or not.

If one of the detecting values satisfies the misfire condition, "Yes" is determined at the step 310 and the program goes to the step 304. Under this condition, even if a misfire occurs in the engine 20, the misfire is caused under the control by the electric control device 50b. The fuel injection to the engine 20 is ceased upon the occurrence of the misfire. The stored air-fuel ratio voltage value read at the step 304 is not renewed. In other words, the air-fuel ratio voltage value stored at the step 308 in the last execution of the program is still stored. A predetermined indicator of the meter 14 for indicating the specific cause of the misfire is turned on.

Afterwards, even if "No" is determined at the step 306, the steps 304, 306 and 310 are repeated as long as the determination "Yes" is provided at the step 310. If, although the air-fuel ratio sensor voltage value is smaller than the product made by the multiplication of the stored air-fuel ratio sensor voltage value and the lower limit coefficient, or the air-fuel ratio sensor voltage value is larger than the product made by the multiplication of the stored air-fuel ratio sensor voltage value and the upper limit coefficient, none of the detecting values satisfies the misfire condition and "No" is determined at the step 310, the program goes to the step 312.

At the step 312, a command data is transmitted to the meter 14 from the electric control device 50b. Thus, the warning lamp 14b blinks at the step 314, and the buzzer 14c sounds at the step 316. Next, the program goes to the step 318 to determine a mount condition of the air-fuel ratio sensor 62, i.e., whether the air-fuel ratio sensor 62 is provided to each cylinder or not. In this regard, a condition that the air-fuel ratio sensor 62 is not provided to each cylinder is the condition such that one air-fuel ratio sensor 62 is placed at a location in close proximity to the collecting section 41a of the exhaust manifold 41 or downstream thereof.

If the air-fuel ratio sensor 62 is provided to each cylinder and "Yes" is determined at the step 318, the program goes to the step 320 to cease the fuel injection to the cylinder where the misfire occurs. Then, the program returns to the step 304. If the air-fuel ratio sensor 62 is not provided to each cylinder and "No" is determined at the step 318, the program goes to the step 322 to cancel the fuel injection adjusting control by the electric control device 50b. This process is provided to prevent the fuel injection adjusting control from being continuously implemented without finding which cylinder has the misfire. That is, the wrong fuel injection adjusting control is prevented. The program then returns to the step 304. Afterwards, the steps 304-322 are repeated until operation of the engine 20 is stopped.

According to this preferred embodiment, if it is determined that an abnormal misfire occurs, no fuel injection amount adjusting control is implemented by the electric control device 50b. Thereby, the fuel injection amount can be kept in an appropriate range. Also, because the air-fuel ratio sensor 62 is provided to each exhaust conduit extending from the respective cylinder, the electric control device 50b can determine which cylinder has the misfire and can cease the fuel injection to only the cylinder that has the abnormal misfire. Actions and effects of the misfire detecting device B and the water jet propulsion watercraft 10 having the misfire detecting device B other than those described above are the same as those of the misfire detecting device A and the water jet propulsion watercraft 10 having the misfire detecting device A.

Third Preferred Embodiment

Figure 13:
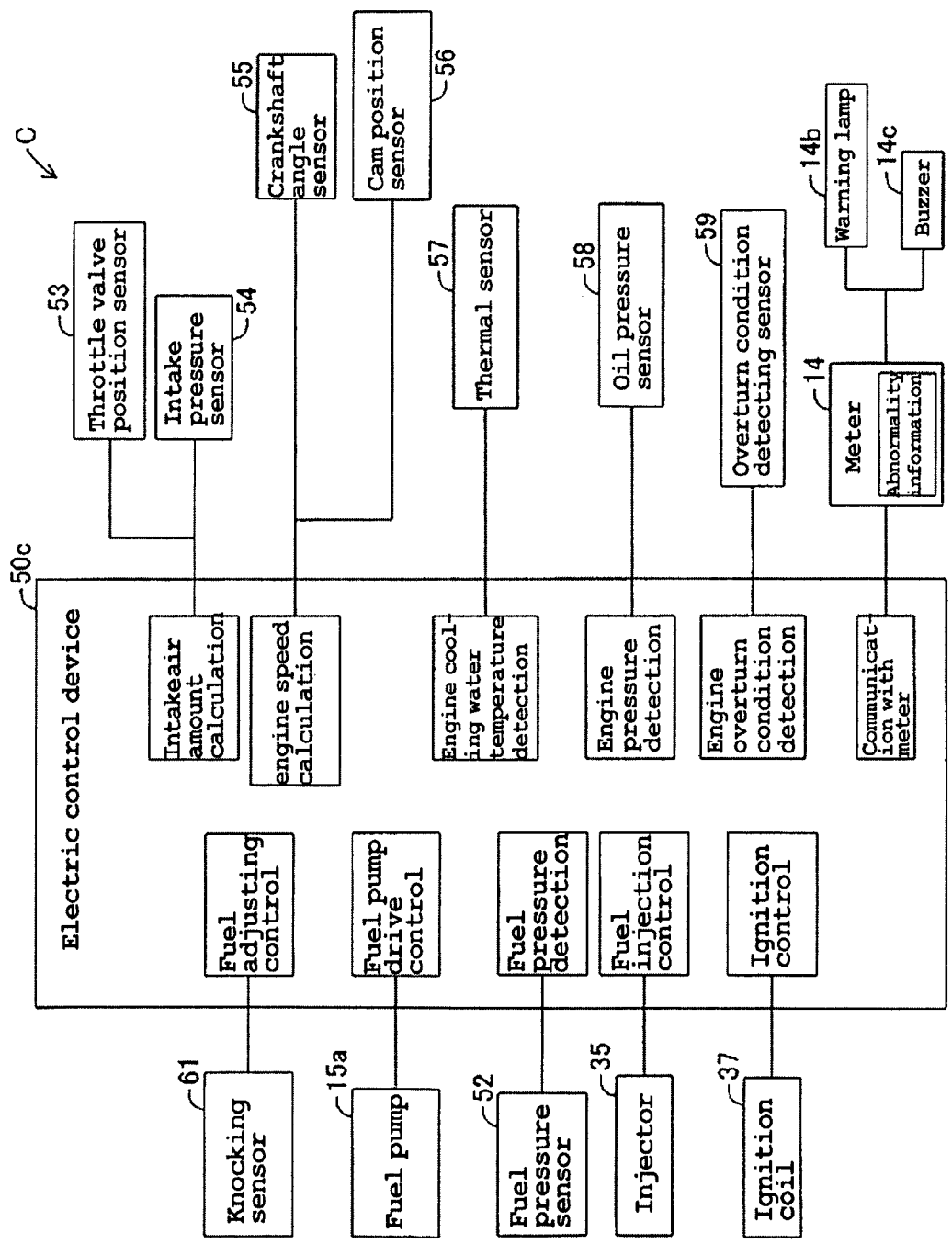
FIG. 13 is a block diagram of the major portion of the misfire detecting device configured in accordance with a third preferred embodiment of the present invention.

FIG. 13 illustrates a misfire detecting device C configured in accordance with a third preferred embodiment of the present invention. In this misfire detecting device C, a knocking sensor 61 replaces the oxygen sensor 51 used in the misfire detecting device A described above. The knocking sensor 61 detects a vibration caused by the abnormal combustion in the engine 20 and converts the vibration to an electric signal to transmit to the electric control device 50c. The electric control device 50c determines whether a knocking or a misfire occurs or not by determining, using the electric signal, whether a voltage value of the knocking sensor 61 is in a normal range or not.

In addition, the electric control device 50c implements, based upon detection values of the knocking sensor 61, the fuel adjusting control in which a density of the mixture made of the fuel and the air injected toward the combustion chambers of the cylinder block 23 from the injectors 35 and an injection amount of the mixture are adjusted. In this regard, either one knocking sensor 61 can be provided to the cylinder block 23, or a plurality of knocking sensors 61 can be individually provided to the four exhaust port outlets 27b communicating with the exhaust port portions where the exhaust valves 27 of the respective cylinders are placed and also communicating with the exhaust manifold 41. Other portions of the misfire detecting device C and of the water jet propulsion watercraft having the misfire detecting device C are the same as those of the misfire detecting device A and of the water jet propulsion watercraft having the misfire detecting device A. Accordingly, the same numerals and symbols are assigned to the same portions and further descriptions are omitted.

Figure 14:
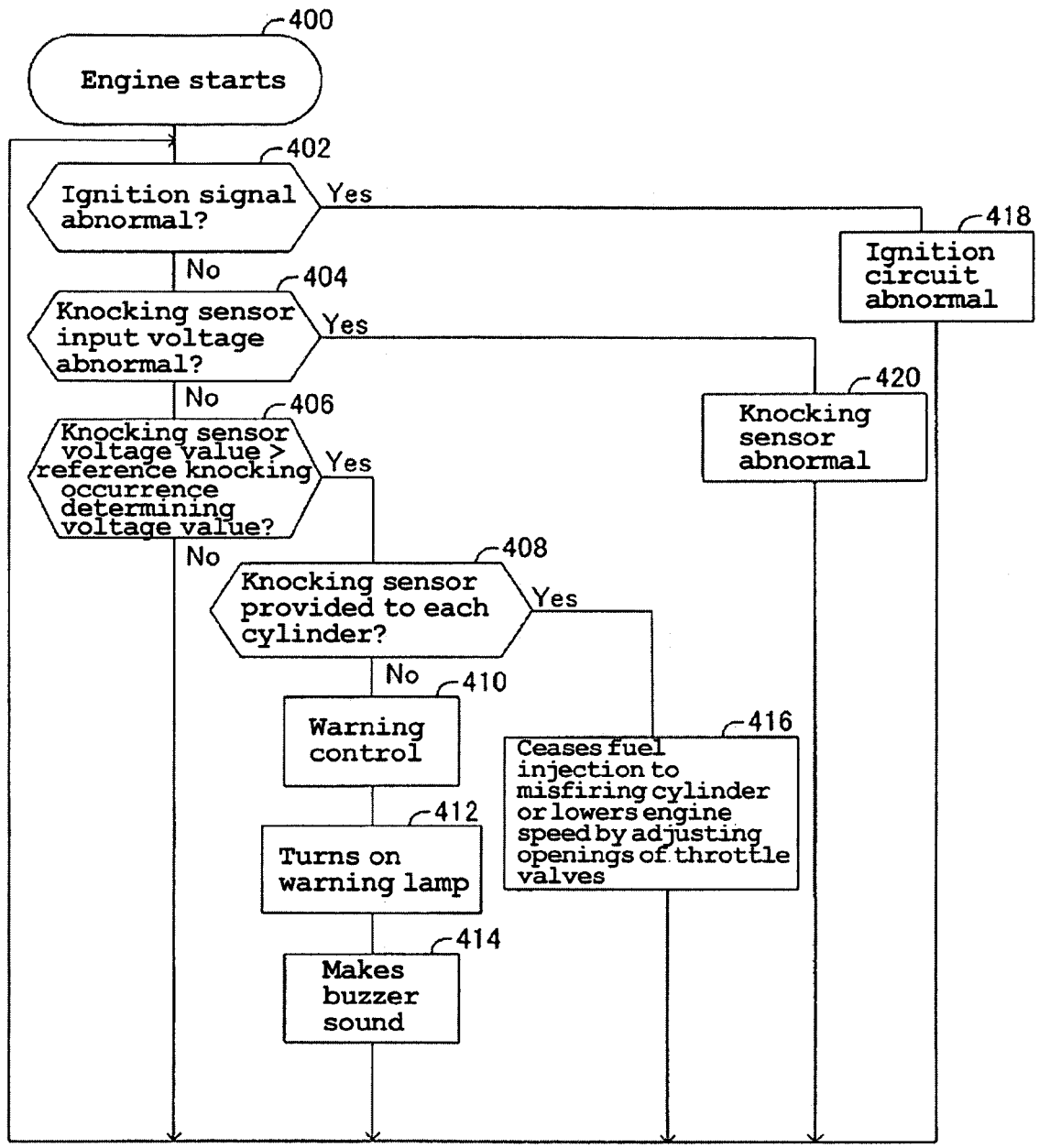
FIG. 14 is a flowchart of a program for providing an indication of the abnormal misfire based upon a knocking sensor voltage value in accordance with a preferred embodiment of the present invention.

If some abnormal misfires occur in the engine 20 when the water jet propulsion watercraft 10 having the misfire detecting device C runs, warning is provided in accordance with the program shown in FIG. 14. The program starts at the step 400. Upon starting of the engine 20, the program goes to the step 402 to determine whether abnormal ignition signals are sent to the ignition plugs 38 from the ignition coils 37 or not. This is the step for determining whether the ignition device working as the igniting device according to a preferred embodiment of the present invention has an abnormality or not. If "No" is determined because the ignition device has no abnormality, the program goes to the step 404 to determine whether a knocking sensor input voltage has an abnormality or not.

This is the step for determining whether the knocking sensor 61 has an abnormality or not, for example, whether a wiring (or wirings) connecting the knocking sensor 61 (or knocking sensors 61) and the electric control device 50c to each other is interrupted or not. If the knocking sensor 61 has no abnormality and "No" is determined, the program goes to the step 406. At the step 406, it is determined whether a knocking sensor voltage value is larger than a preset reference knocking occurrence determining voltage value or not. The reference knocking occurrence determining voltage value is a value which is previously set as a detection voltage value whereby it is determined that a knocking occurs in the engine 20.

If the knocking sensor voltage value is smaller than the reference knocking occurrence determining voltage value and "No" is determined, the program returns to the step 402. Afterwards, if neither the ignition device nor the knocking sensor 61 has an abnormality and as long as the determination "No" is provided at the step 406, the steps 402, 404, 406 are repeated. If a knocking occurs in the engine 20, the knocking sensor voltage value is larger than the reference knocking occurrence determining voltage value and "Yes" is determined at the step 406, the program goes to the step 408. At the step 408, a mount condition of the knocking sensor 61 is determined. That is, whether the knocking sensor 61 is provided to each cylinder or not is determined. In this regard, a condition that the knocking sensor 61 is provided to each cylinder is the condition such that one knocking sensor 61 is placed at the collecting section 41a of the exhaust manifold 41.

If the knocking sensor 61 is not provided to each cylinder and "No" is determined at the step 408, the program goes to the step 410 to transmit a command data to the meter 14 from the electric control device 50c. The warning lamp 14b blinks at the step 412, and the buzzer 14c sounds at the step 414. Next, the program returns to the step 402. Afterwards, the steps described above are repeated.

If the knocking sensor 61 is provided to each cylinder and "Yes" is determined at the step 408, the program goes to the step 416 to cease the fuel injection to the cylinder where the misfire occurs or to lower the engine speed of the engine 20 by adjusting the openings of the throttle valves 34. Then, the program returns to the step 402. Afterwards, the steps 402-416 are repeated until the operation of the engine 20 is stopped. If the ignition device has an abnormality and "Yes" is determined at the step 402, the program goes to the step 418 to transmit a signal data for indicating that the ignition device has the abnormality to a predetermined portion of the meter 14 from the electric control device 50c.

Under this condition, the steps 402 and 418 are repeated until the operation of the engine 20 is stopped. If, although the ignition device has no abnormality, the knocking sensor 61 has an abnormality and "Yes" is determined at the step 404, the program goes to the step 420. At the step 420, a signal data for indicating that the knocking sensor 61 has the abnormality is transmitted to the predetermined portion of the meter 14 from the electric control device 50c. Under the condition, the steps 402, 404 and 420 are repeated until the operation of the engine 20 is stopped.

In this preferred embodiment, the knocking sensor 61 can preferably be provided to each one of the four exhaust port outlets 27b communicating with the exhaust port portions where the exhaust valves 27 of the respective cylinders are placed and also communicating with the exhaust manifold 41. The electric control device 50c thus can determine which cylinder has a misfire. Hence, the electric control device 50c can cease the fuel injection to the cylinder that has the abnormal misfire and lower the engine speed of the engine 20 by adjusting the openings of the throttle valves 34 to prevent unburnt gases from mingling with exhaust gases. The properties of the exhaust gases can be kept in a good condition, accordingly. Also, after-fire is prevented from occurring in the exhaust manifold 41 or the exhaust pipe 42, and the catalyst 45 disposed in the exhaust manifold 41 can be kept in a good condition. Because the knocking sensor 61 only needs to be attached to one of outer walls of the cylinder block 23 or the exhaust manifold 41, no troublesome work is necessary for attaching the knocking sensor 61, and only a small machining of the engine 20 is required for attaching the knocking sensor 61.

Fourth Preferred Embodiment

Figure 15:
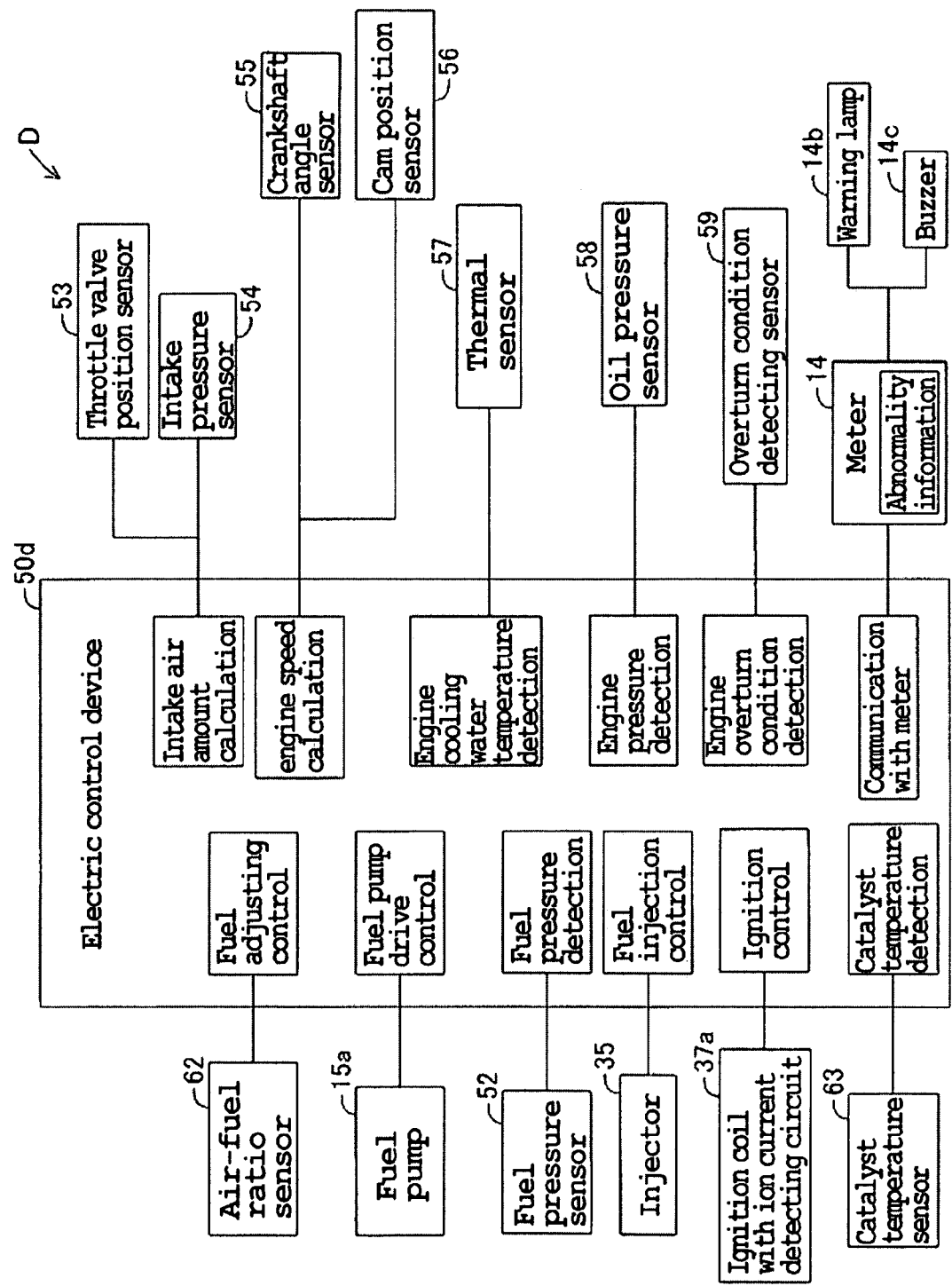
FIG. 15 is a block diagram of the major portion of the misfire detecting device configured in accordance with a fourth preferred embodiment of the present invention.
Figure 16:
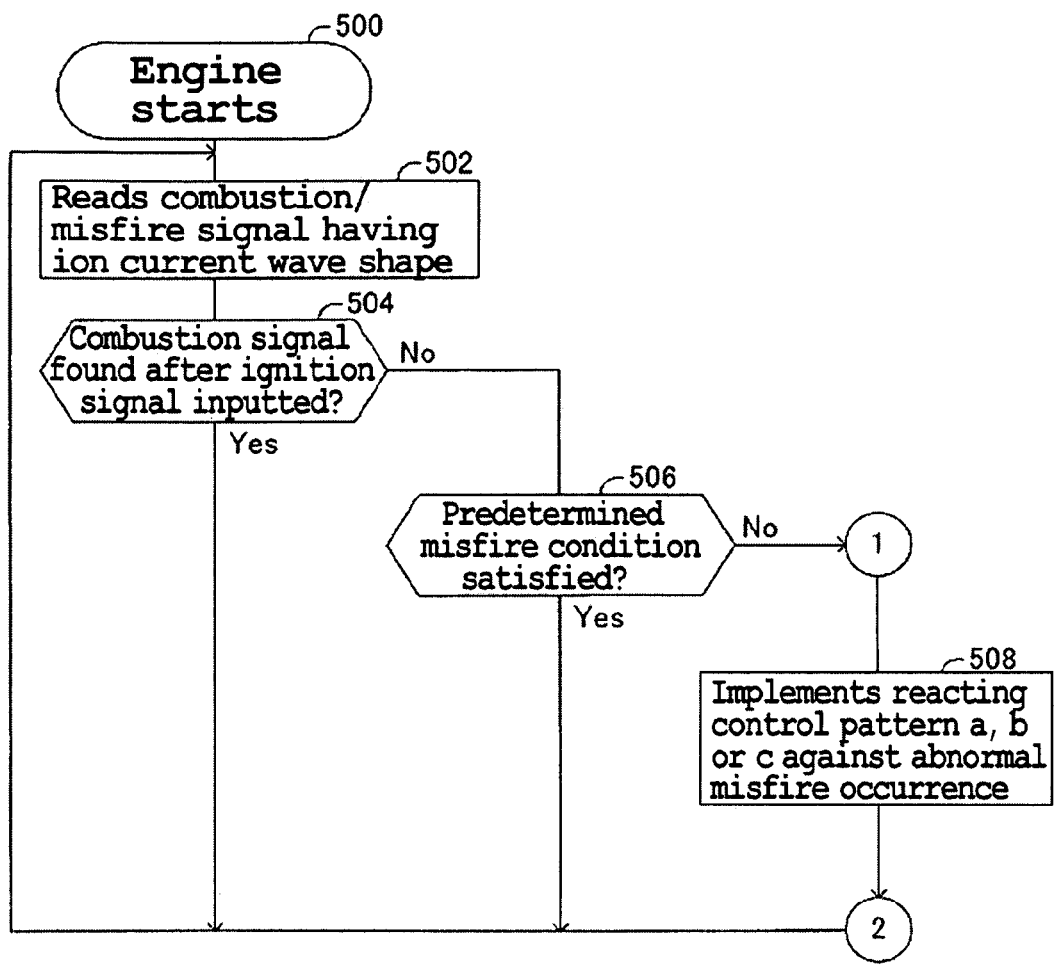
FIG. 16 is a flowchart of a program for determining whether an abnormal misfire occurs or not based on an ignition signal in accordance with a preferred embodiment of the present invention.

FIG. 15 illustrates a misfire detecting device D configured in accordance with a fourth preferred embodiment of the present invention. The misfire detecting device D has an ignition coil 37a provided with an ion current detecting circuit working as the ignition coil of the present invention provided with the ion current detecting circuit. The misfire detecting device D also has a catalyst temperature sensor 63 arranged to detect a temperature of the catalyst 45. The catalyst temperature sensor 63 is disposed at the catalyst 45 or at a location in close proximity to the catalyst 45. The air-fuel ratio sensor 62, the catalyst temperature sensor 63 and so forth are connected to an electric control device 50d. Other portions of the misfire detecting device D and of the water jet propulsion watercraft 10 having the misfire detecting device D are the same as those of the misfire detecting device A and of the water jet propulsion watercraft 10 having the misfire detecting device A described above. Accordingly, the same numerals and symbols are assigned to the same portions and further descriptions are omitted.

If some abnormal misfires occur in the engine 20 when the water jet propulsion watercraft 10 having the misfire detecting device D runs, a warning is provided in accordance with the programs shown in FIGS. 16 through 19. The program shown in FIG. 16 starts at the step 500. Upon starting of the engine 20, the program goes to the step 502 to read a combustion/misfire signal having an ion current wave shape and transmitted from the ignition coil 37a with the ion current detecting circuit. The ignition coil 37a with the ion current detecting circuit has the ion current detecting circuit. The electric control device 50d converts the ion current signal detected by the coil 37a with the ion current detecting circuit to a combustion signal and determines, if no combustion signal is found after an ignition signal is inputted, that a misfire occurs.

If the combustion signal is found after the ignition signal is inputted, "Yes" is determined at the step 504 and the program returns to the step 502. Afterwards, the steps 502 and 504 are repeated until no combustion signal is found because a misfire occurs. If no combustion signal is found and "No" is determined at the step 504, the program goes to the step 506 to determine whether any one of detection values of the throttle valve position sensor 53, etc. satisfies the misfire condition or not, i.e., whether any one of the over-revolution condition, the overheat condition, the oil pressure decrease condition, the turnover condition and the idling condition arises or not.

If one of the detecting values satisfies the misfire condition, the determination "Yes" is made at the step 506, and the program returns to the step 502. The misfire under the condition is caused through the control by the electric control device 50d, the fuel injection to the engine 20 is ceased with the misfire occurring. Afterwards, even though "No" is determined at the step 504, the steps 502, 504 and 506 are repeated so long as the determination "Yes" is provided at the step 506. If, although no combustion signal is found because of a misfire, none of the detecting values satisfies the misfire condition and "No" is determined at the step 506, the program goes to one of reacting control patterns a, b and c shown in FIGS. 17 through 19, respectively, against the abnormal misfire occurrence so that the electric control device 50d implements one of them.

Figure 17:
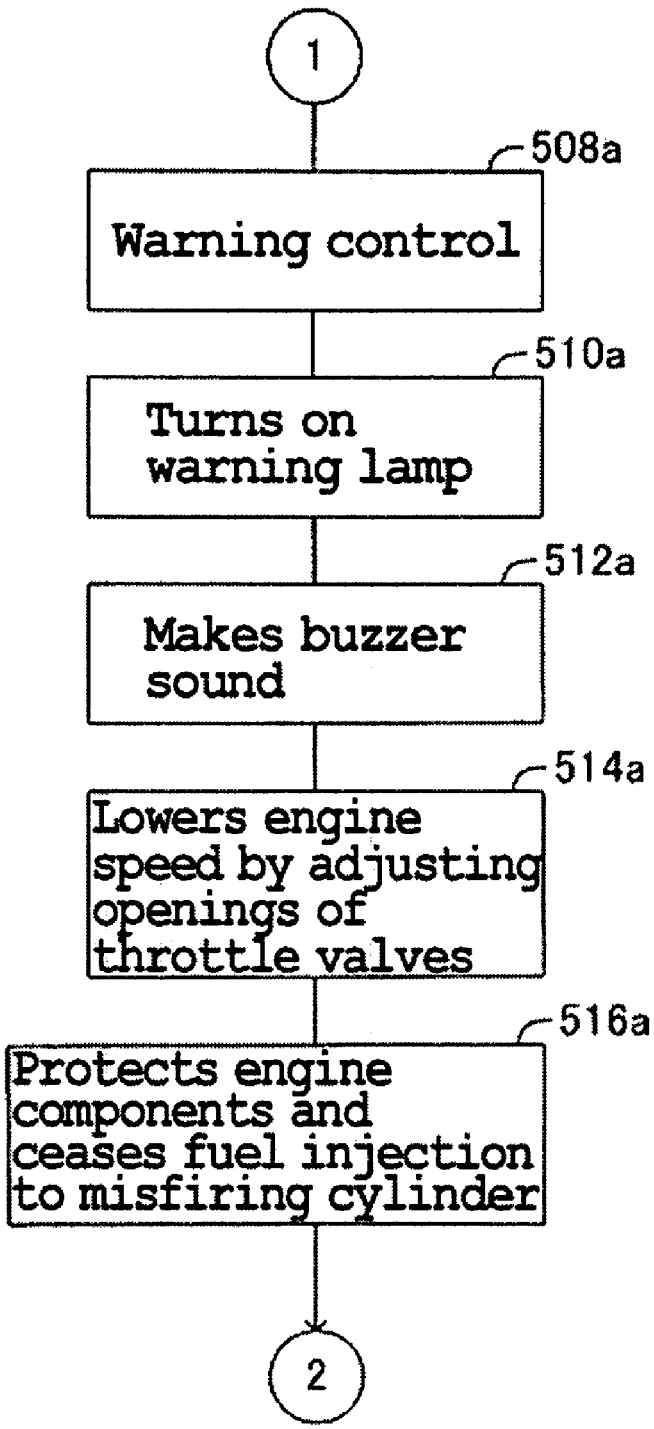
FIG. 17 is a flowchart of a program for a reacting control manner used when the program shown in FIG. 16 determines that the misfire occurs.

In the reacting control pattern a against the abnormal misfire occurrence shown in FIG. 17, a command data is transmitted, at the step 508a, to the meter 14 from the electric control device 50d. Thus, the warning lamp 14b blinks at the step 510a, and the buzzer 14c sounds at the step 512a. Next, at the step 514a, the engine speed of the engine 20 is lowered by adjusting the openings of the throttle valves 34.

In addition, at the step 516a, the fuel injection to the cylinder where the misfire occurs is ceased, and various controls arranged to protect engine components are implemented. Afterwards, the various steps described above are repeated until the operation of the engine 20 is stopped. In one variation, one of the steps 514a and 516a can be selected.

Figure 18:
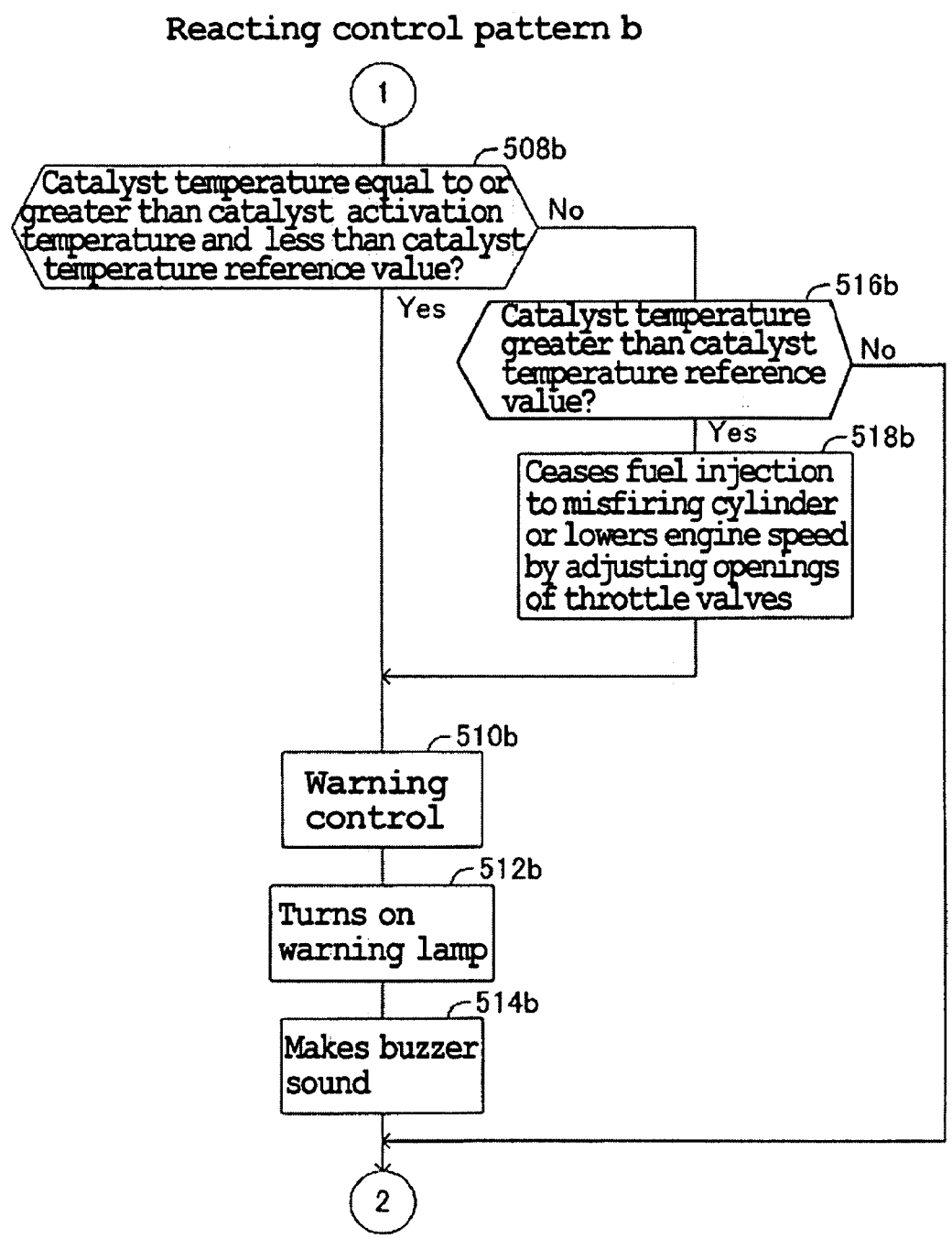
FIG. 18 is a flowchart of a program for another reacting control manner used when the program shown in FIG. 16 determines that the misfire occurs.

In the reacting control pattern b against the abnormal misfire occurrence shown in FIG. 18, at the step 508b, it is determined whether a detection value of the catalyst temperature sensor 63 is equal to or greater than the catalyst activation temperature and less than a catalyst temperature reference value or not. The catalyst temperature reference value is a temperature that is slightly lower than a predetermined high temperature at which the catalyst 45 can deteriorate. If the detection value of the catalyst temperature sensor 63 is equal to or greater than the catalyst activation temperature and less than the catalyst temperature reference value, "Yes" is determined at the step 508b and the program goes to the step 510b.

At the step 510b, a command data is transmitted to the meter 14 from the electric control device 50d. The warning lamp 14b blinks on at the step 512b, and the buzzer 14c sounds at the step 514b. The program then returns to the step 502. If the detection value of the catalyst temperature sensor 63 is neither equal to or greater than the catalyst activation temperature nor less than the catalyst temperature reference value and "No" is determined at the step 508b, the program goes to the step 516b to determines whether the detection value of the catalyst temperature sensor 63 is greater than the catalyst temperature reference value or not.

If the detection value of the catalyst temperature sensor 63 is greater than the catalyst temperature reference value and "Yes" is determined at the step 516b, the program goes to the step 518b to cease the fuel injection to the cylinder where the misfire occurs or to lower the engine speed of the engine 20 by adjusting the openings of the throttle valves 34. Then, the program goes to the step 510b. After the steps 510b, 512b and 514b described above are executed, the program returns to the step 502. If the detection value of the catalyst temperature sensor 63 is less than the catalyst temperature reference value, "No" is determined at the step 516b and the program returns to the step 502. Under this condition, although the abnormal misfire occurs, the temperature of the catalyst 45 is not a high temperature at which the catalyst 45 deteriorates. Neither is the warning issued nor is the fuel injection ceased, accordingly. The various processes described above are repeated until operation of the engine 20 is stopped.

Figure 19:
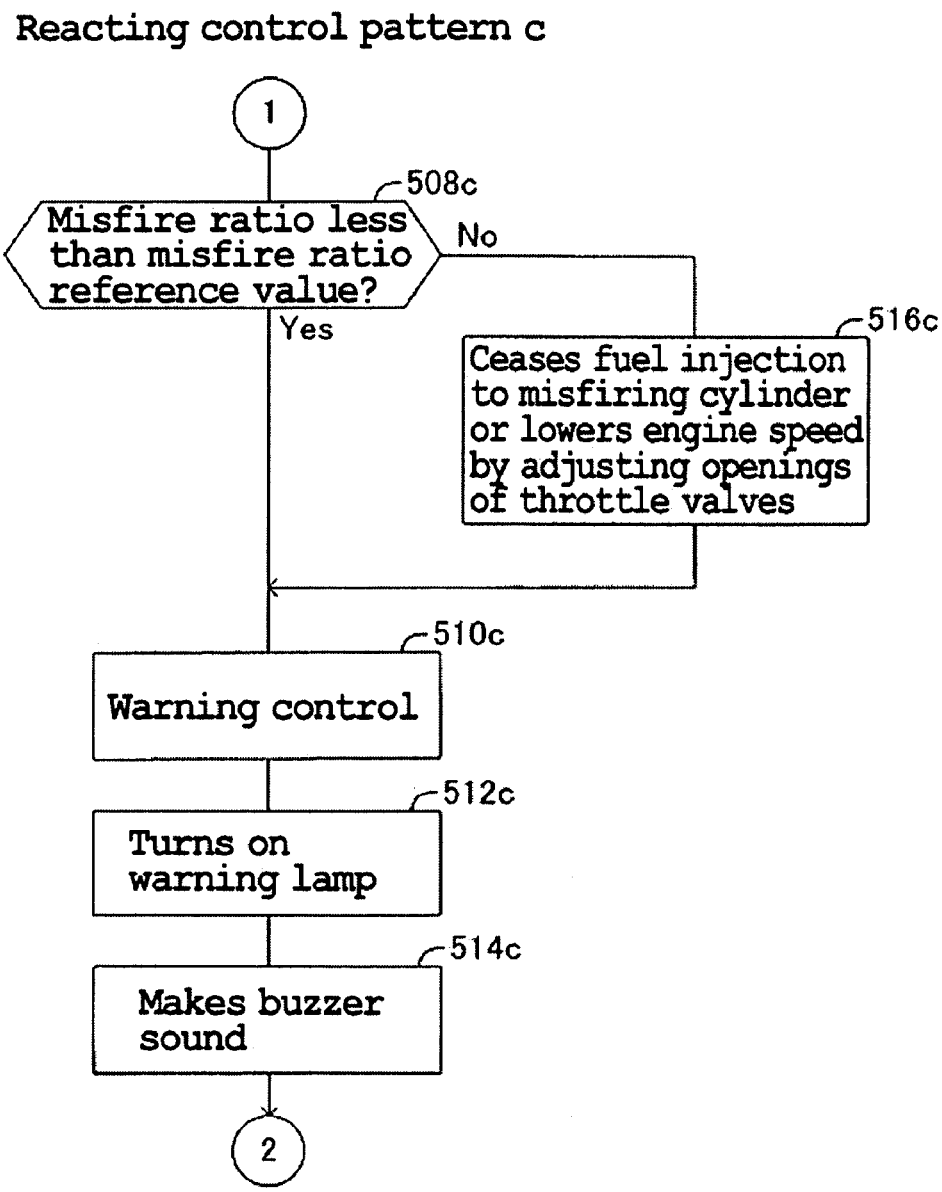
FIG. 19 is a flowchart of a program for a further reacting control manner used when the program shown in FIG. 16 determines that the misfire occurs.
Figure 20:
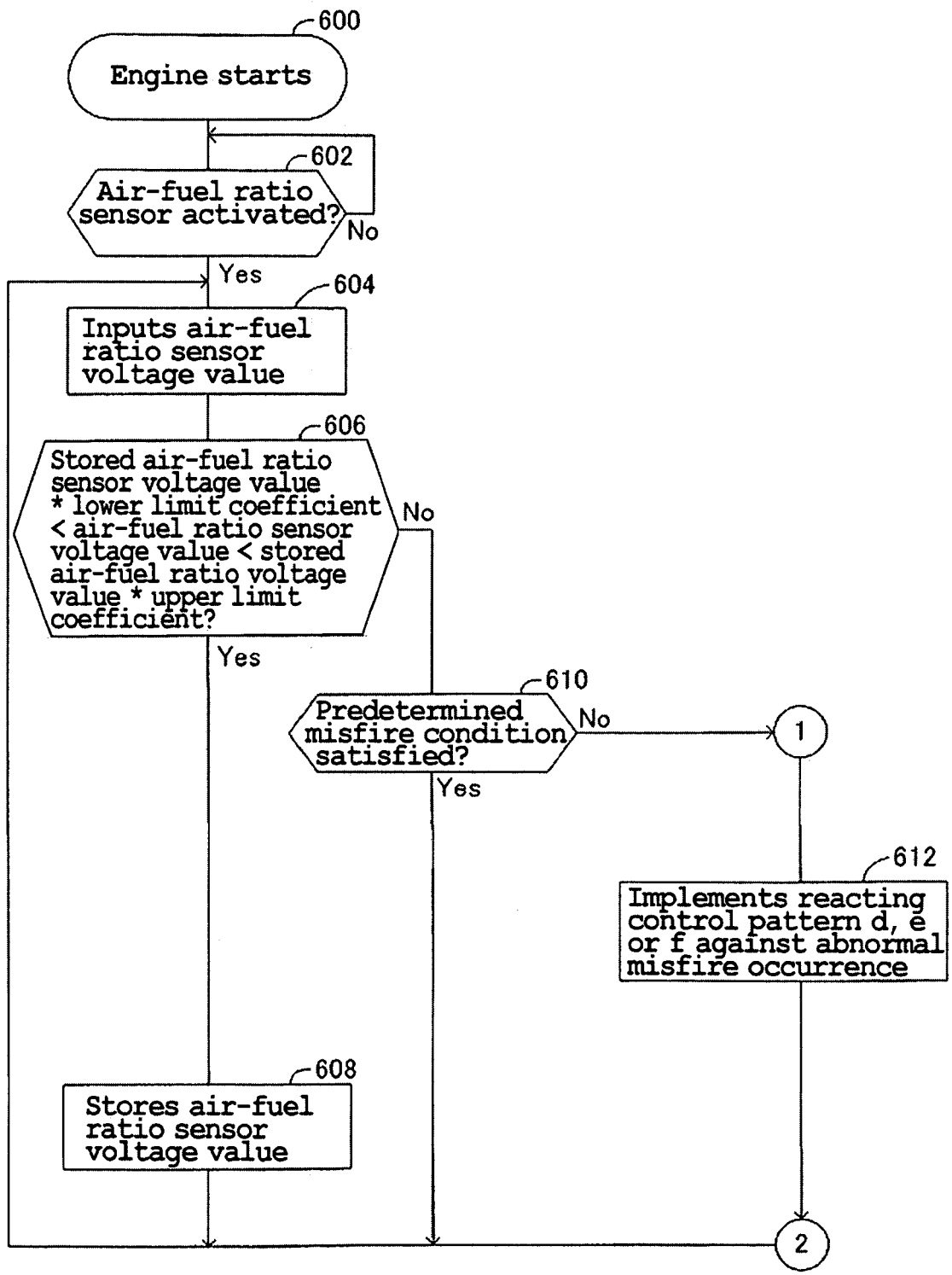
FIG. 20 is a flowchart of a program for providing an indication of the abnormal misfire based upon an air-fuel ratio voltage value.

In the reacting control pattern c against the abnormal misfire occurrence shown in FIG. 19, at the step 508c, it is determined whether a misfire ratio is less than a misfire reference value or not. The misfire reference value is a value of the misfire ratio that is previously set as a value close to the maximum value in a range wherein frequent occurrence of the misfire does not deteriorate the operation feeling. If the misfire ratio is less than the misfire reference value, "Yes" is determined at the step 508c and the program goes to the step 510c. At the step 510c, a command data is transmitted to the meter 14 from the electric control device 50d. The warning lamp 14b blinks at the step 512c, and the buzzer 14c sounds at the step 514c. The program then returns to the step 502.

If the misfire ratio is equal to or greater than the misfire reference value and "No" is determined at the step 508c, the program goes to the step 516c to cease the fuel injection to the cylinder where the misfire occurs or to lower the engine speed of the engine 20 by adjusting the openings of the throttle valves 34. The program then goes to the step 510c. After the steps 510c, 512c and 514c described above are executed, the program returns to the step 502. The various processes described above are repeated until the operation of the engine 20 is stopped.

According to this preferred embodiment, because the ignition coil 37a having the ion current detecting circuit is provided to each cylinder, the electric control device 50d can determine which cylinder has the misfire and can cease only the fuel injection to the cylinder where the abnormal misfire occurs. As a result, unburnt gases are prevented from mingling with exhaust gases, and the exhaust gases can be kept in a good condition. Also, because the ignition coil 37a with the ion current detecting circuit detects a misfire by detecting an ion current, whether the combustion occurs or not when the ignition is given can be surely and promptly determined. Thereby, accuracy of the misfire detection can be enhanced.

In addition, the electric control device 50d ceases the fuel injection to the cylinder where the misfire occurs if the temperature of the catalyst 45 is equal to or greater than the catalyst temperature reference value. Hence, except for the situation in which the deterioration of the catalyst 45 is concerned, the engine does not need to frequently repeat suspension and restart of the fuel injection. The operation feeling of the water jet propulsion watercraft 10 that can deteriorate when the suspension and the restart of the fuel injection are frequently repeated one after another can be prevented and kept in a good condition. Also, if the misfire ratio is equal to or greater than the misfire ratio reference value, the electric control device 50d ceases the fuel injection to the cylinder where the misfire whose misfire ratio is equal to or greater than the misfire ratio reference value occurs. Thereby, if the misfire is a relatively light abnormal misfire, the fuel injection is not required to be ceased.

Variation 1

FIGS. 20 through 23 show flowcharts to implement a variation of the program shown in FIG. 12 using the misfire detecting device D configured in accordance with the fourth preferred embodiment. The program starts at the step 600. Upon starting of the engine 20, the program goes to the step 602 to determine whether the air-fuel ratio sensor 62 is activated or not. At the step 602, if "No" is determined, the program repeats the step 602. If "Yes" is determined at the step 602 because the temperature of the air-fuel ratio sensor 62 reaches the predetermined temperature, the program goes to the step 604 to read a data of air-fuel ratio sensor voltage value detected by the air-fuel ratio sensor 62.

Next, at the step 606, it is determined whether the air-fuel ratio sensor voltage value obtained in the process of the step 604 is larger than a product made by the multiplication of a stored air-fuel ratio sensor voltage value that is stored previously and a lower limit coefficient and smaller than a product made by the multiplication of the stored air-fuel ratio sensor voltage value and a upper limit coefficient or not. If "Yes" is determined at the step 606 because the air-fuel ratio sensor voltage value is larger than the product made by the multiplication of the stored air-fuel ratio sensor voltage value and the lower limit coefficient and smaller than the product made by the multiplication of the stored air-fuel ratio sensor voltage value and the upper limit coefficient, the program goes to the step 608. At the step 608, the stored air-fuel ratio sensor voltage value is renewed. In this process, the stored air-fuel ratio sensor voltage value read (obtained) at the step 604 replaces the stored air-fuel ratio sensor voltage value relative to the predetermined engine speed, throttle valve opening or intake pressure. Then, the program returns to the step 604. Afterwards, as long as the determination "Yes" is provided at the step 606, the steps 604, 606 and 608 are repeated.

If "No" is determined at the step 606 because the air-fuel ratio sensor voltage value is smaller than the product made by the multiplication of the stored air-fuel ratio sensor voltage value and the lower limit coefficient, or the air-fuel ratio sensor voltage value is larger than the product made by the multiplication of the stored air-fuel ratio sensor voltage value and the upper limit coefficient, the program goes to the step 610. At the step 610, it is determined whether any one of detection values of the throttle valve position sensor 53, the intake pressure sensor 54, the crankshaft angle sensor 55, the cam position sensor 56, the thermal sensor 57, the oil pressure sensor 58 and the turnover condition detecting sensor 59 satisfies the misfire condition or not, i.e., whether any one of the over-revolution condition, the overheating condition, the oil pressure decrease condition, the turnover condition and the idling condition arises or not.

If one of the detecting values satisfies the misfire condition, "Yes" is determined at the step 610 and the program goes to the step 604. Under the condition, even if a misfire occurs in the engine 20, the misfire is caused through the control by the electric control device 50*d*. The fuel injection to the engine 20 is ceased with the misfire occurring. The stored air-fuel ratio voltage value read at the step 604 is not renewed. In other words, the air-fuel ratio voltage value stored at the step 608 in the last execution of the program is still stored. Afterwards, even if "No" is determined at the step 606, the steps 604, 606 and 610 are repeated as long as the determination "Yes" is provided at the step 610.

Figure 21:
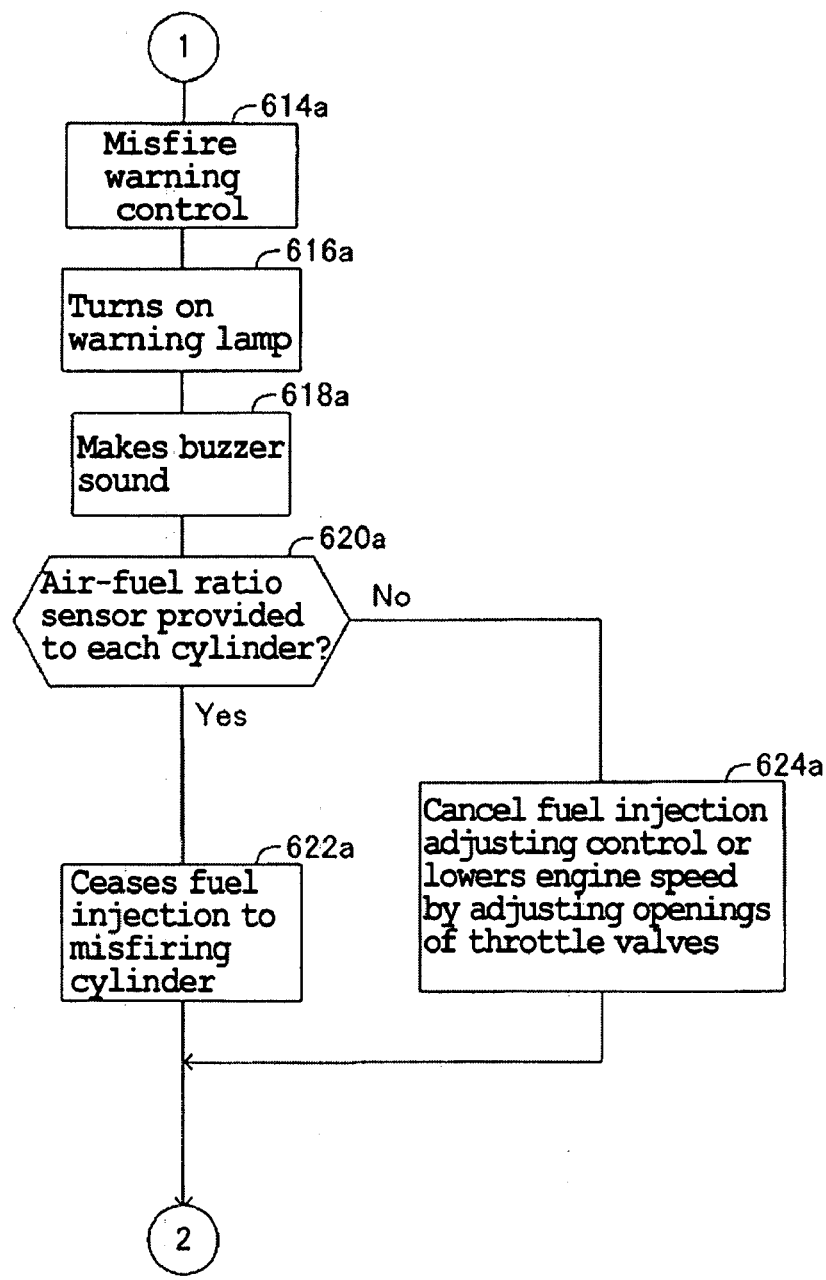
FIG. 21 is a flowchart of a program for a reacting control manner used when the program shown in FIG. 20 determines that the misfire occurs.
Figure 22:
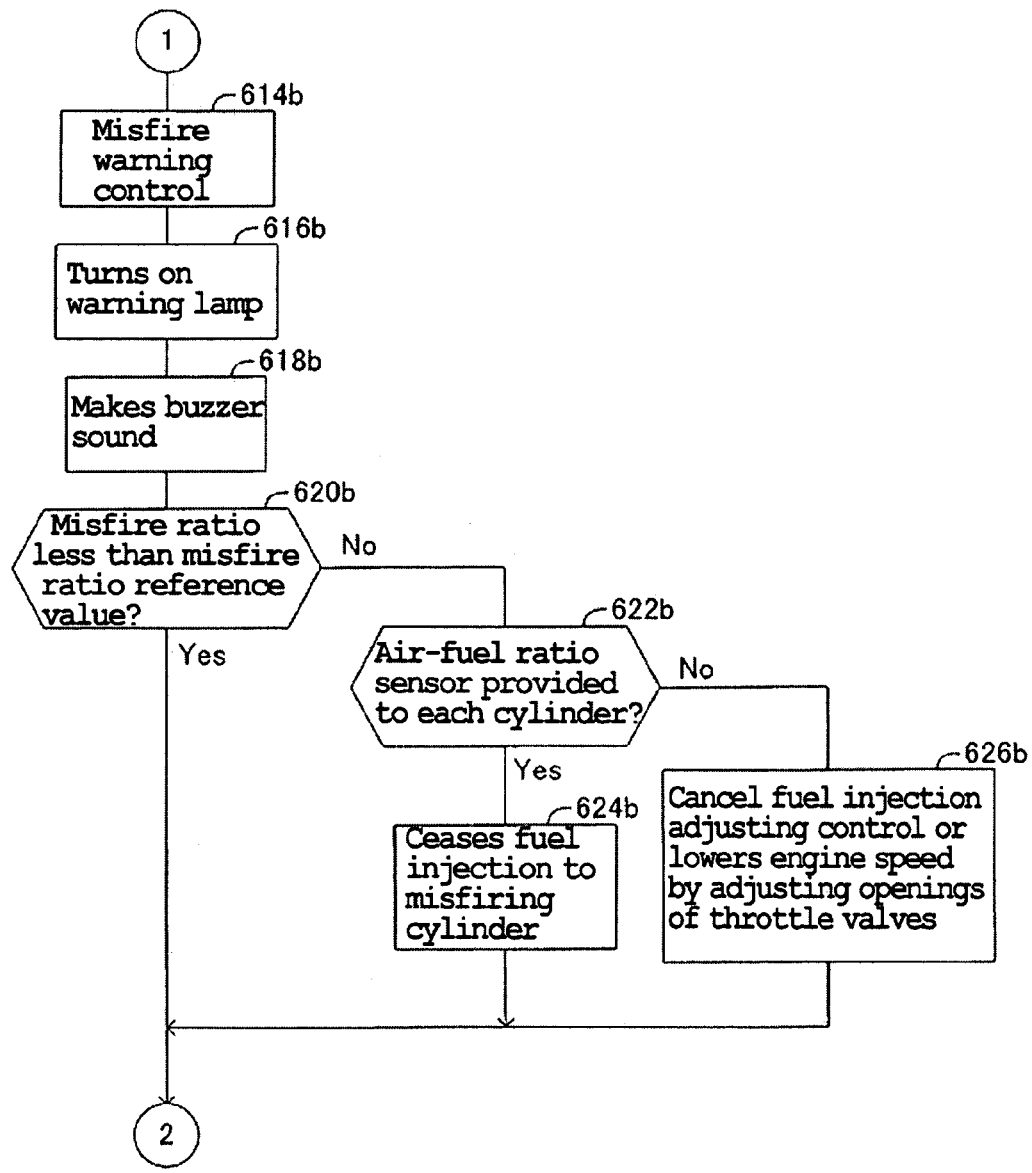
FIG. 22 is a flowchart of a program for another reacting control manner used when the program shown in FIG. 20 determines that the misfire occurs.
Figure 23:
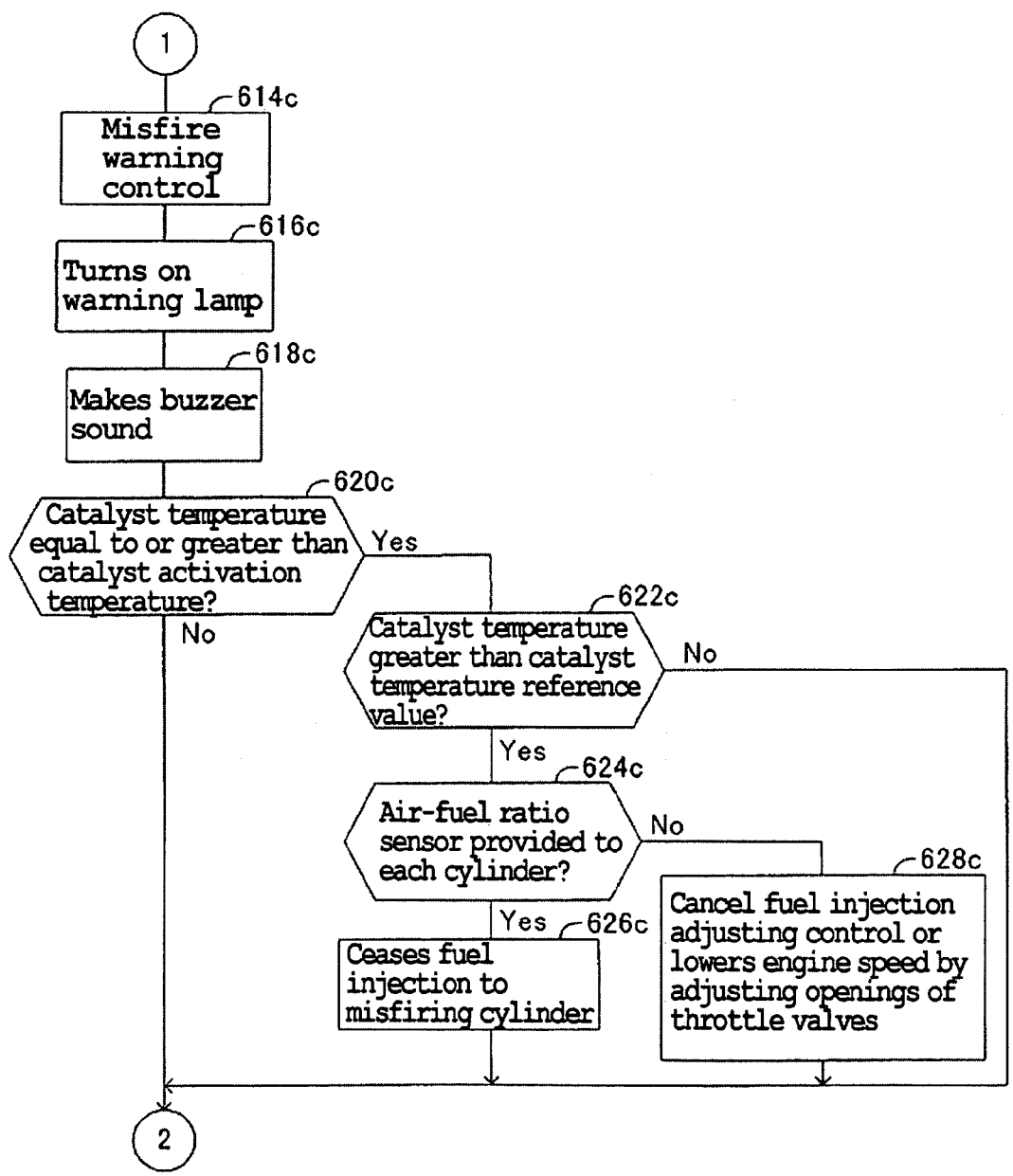
FIG. 23 is a flowchart of a program for a further reacting control manner used when the program shown in FIG. 20 determines that the misfire occurs.

If none of the detecting values satisfies the misfire condition and "No" is determined at the step 610, the program goes to one of reacting control patterns d, e and f shown in FIGS. 21 through 23 so that the electric control device 50*d* implements one of them. In the reacting control pattern d against the abnormal misfire occurrence shown in FIG. 21, a command data is transmitted, at the step 614*a*, to the meter 14 from the electric control device 50*d*. Thus, the warning lamp 14*b* blinks at the step 616*a*, and the buzzer 14*c* sounds at the step 618*a*. Next, the program goes to the step 620*a* to determine a mount condition of the air-fuel ratio sensor 62, i.e., whether the air-fuel ratio sensor 62 is provided to each cylinder or not.

If the air-fuel ratio sensor 62 is provided to each cylinder and "Yes" is determined at the step 620*a*, the program goes to the step 622*a* to cease the fuel injection to the cylinder where the misfire occurs. Then, the program returns to the step 604. If the air-fuel ratio sensor 62 is not provided to each cylinder and "No" is determined at the step 620*a*, the program goes to the step 624*a* to cancel the fuel injection adjusting control by the electric control device 50*d* or to lower the engine speed of the engine 20 by adjusting the openings of the throttle valves 34. The program then returns to the step 604. Afterwards, the steps 604-624*a* are repeated until the operation of the engine 20 is stopped.

In the reacting control pattern e against the abnormal misfire occurrence shown in FIG. 22, the same processes as those executed at the steps 614*a*, 616*a* and 618*a* of the reacting control pattern d are implemented at the steps 614*b*, 616*b* and 618*b*. At the step 620*b*, it is determined whether a misfire ratio is less than the misfire reference value or not. If the misfire ratio is less than the misfire reference value, "Yes" is determined at the step 620*b* and the program goes to the step 604. If the misfire ratio is equal to or greater than the misfire reference value, the program goes to the step 622*b*. At the step 622*b*, it is determined whether the air-fuel ratio sensor 62 is provided to each cylinder or not. If the air-fuel ratio sensor 62 is provided to each cylinder and "Yes" is determined at the step 622*b*, the program goes to the step 624*b* to cease the fuel injection to the cylinder where the misfire occurs.

Then, the program returns to the step 604. If the air-fuel ratio sensor 62 is not provided to each cylinder and "No" is determined at the step 622*b*, the program goes to the step 626*b* to cancel the fuel injection adjusting control by the electric control device 50*d* or to lower the engine speed of the engine 20 by adjusting the openings of the throttle valves 34. The program then returns to the step 604. Afterwards, the steps 604-626*b* are repeated until operation of the engine 20 is stopped.

In the reacting control pattern f against the abnormal misfire occurrence shown in FIG. 23, the same processes as those executed at the steps 614*a*, 616*a* and 618*a* of the reacting control pattern d are implemented at the steps 614*c*, 616*c*, and 618*c*. At the step 620*c*, it is determined whether a detection value of the catalyst temperature sensor 63 is equal to or greater than the catalyst activation temperature or not. If the detection value of the catalyst temperature sensor 63 is less than the catalyst activation temperature and "No" is determined at the step 620*c*, the program returns to 604. If the detection value of the catalyst temperature sensor 63 is equal to or greater than the catalyst activation temperature and "Yes" is determined at the step 620*c*, the program goes to 622*c*. At the step 622*c*, it is determined whether the detection value of the catalyst temperature sensor 63 is equal to or greater than the catalyst temperature reference value or not.

If the detection value of the catalyst temperature sensor 63 is equal to or greater than the catalyst temperature reference value and "Yes" is determined at the step 622*c*, the program goes to the step 624*c*. At the step 624*c*, it is determined whether the air-fuel ratio sensor 62 is provided to each cylinder or not. If the air-fuel ratio sensor 62 is provided to each cylinder and "Yes" is determined at the step 624*c*, the program goes to the step 626*c* to cease the fuel injection to the cylinder where the misfire occurs. The program then returns to the step 604. If the air-fuel ratio sensor 62 is not provided to each cylinder and "No" is determined at the step 624*c*, the program goes to the step 628c to cancel the fuel injection adjusting control or to lower the engine speed of the engine 20 by adjusting the openings of the throttle valves 34. Then, the program returns to the step 604. Afterwards, the steps 604-628c are repeated until the operation of the engine 20 is stopped.

Fifth Preferred Embodiment

Figure 24:
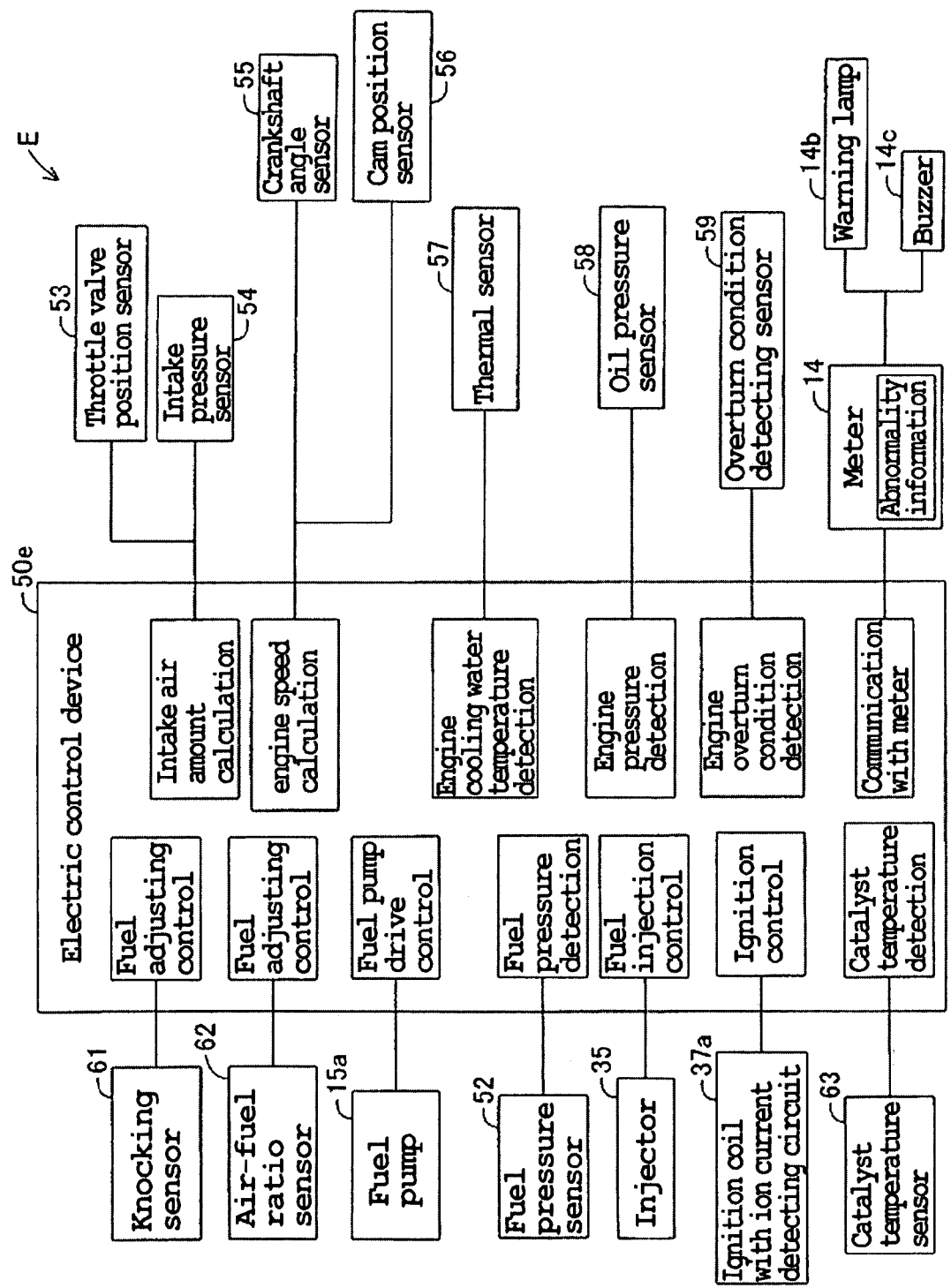
FIG. 24 is a block diagram of the major portion of the misfire detecting device configured in accordance with a fifth preferred embodiment of the present invention.

FIG. 24 shows a misfire detecting device E configured in accordance with a fifth preferred embodiment of the present invention. The misfire detecting device E has a knocking sensor 61. The knocking sensor 61 is connected to an electric control device 50e. Other portions of the misfire detecting device E and of the water jet propulsion watercraft 10 having the misfire detecting device E are the same as those of the misfire detecting device A and of the water jet propulsion watercraft 10 having the misfire detecting device A described above. Accordingly, the same numerals and symbols are assigned to the same portions and further descriptions are omitted. If some abnormal misfires occur in the engine 20 when the water jet propulsion watercraft 10 having the misfire detecting device E runs, warning is provided in accordance with the programs shown in FIGS. 25 through 28.

Figure 25:
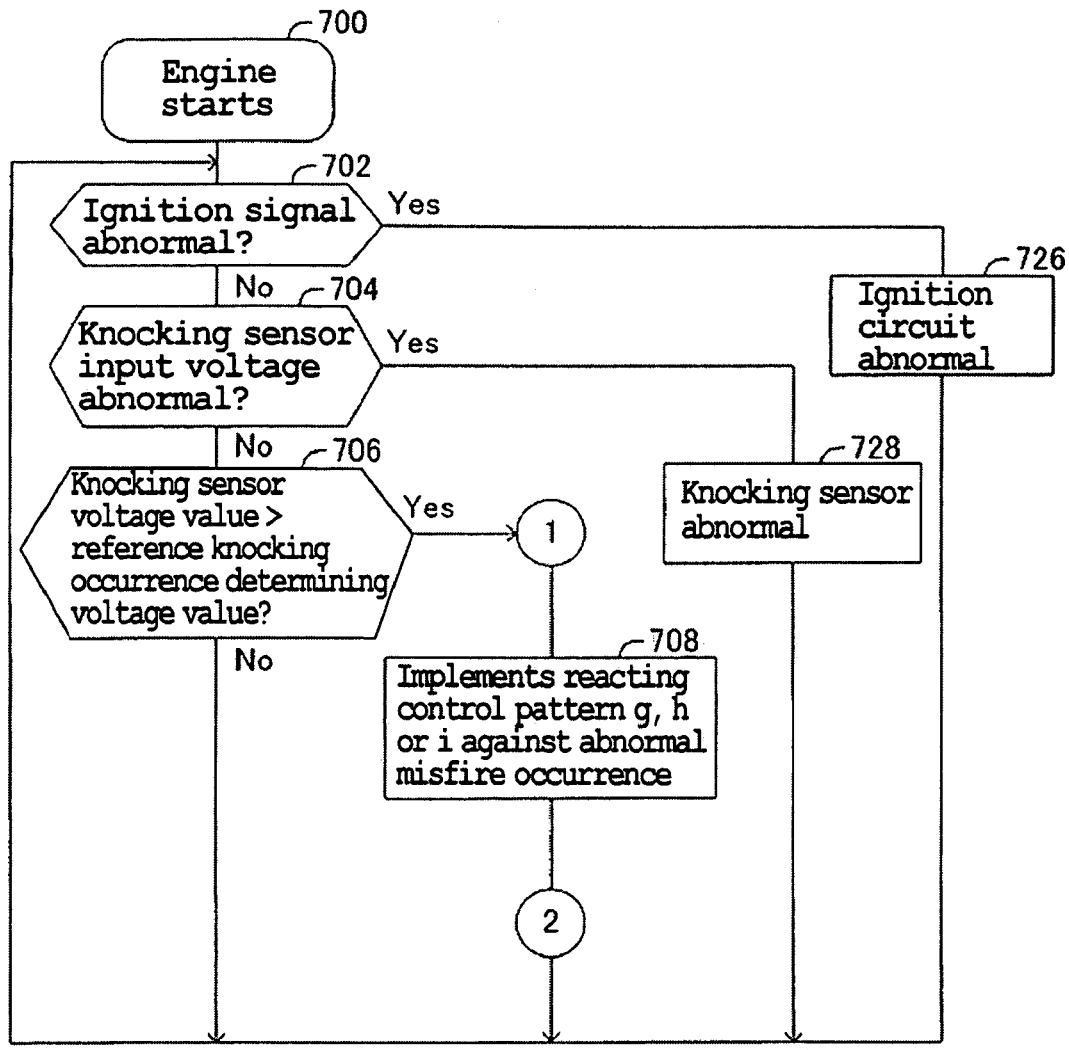
FIG. 25 is a flowchart of a program for providing an indication of the abnormal misfire based upon a knocking sensor voltage value in accordance with a preferred embodiment of the present invention.

The program shown in FIG. 25 starts at the step 700. Upon starting of the engine 20, the program goes to the step 702 to determine whether abnormal ignition signals are sent to the ignition plugs 38 from the ignition coils 37 or not. If the ignition device has no abnormality and "No" is determined at the step 702, the program goes to the step 704 to determine whether a knocking sensor input voltage has an abnormality or not. If the knocking sensor 61 has no abnormality and "No" is determined, the program goes to the step 706. At the step 706, it is determined whether a knocking sensor voltage value is larger than a preset reference knocking occurrence determining voltage value or not.

If the knocking sensor voltage value is smaller than the reference knocking occurrence determining voltage value and "No" is determined, the program returns to the step 702. Afterwards, if neither the ignition device nor the knocking sensor 61 has an abnormality and as long as the determination "No" is provided at the step 706, the steps 702, 704, 706 are repeated. If a knocking occurs in the engine 20, the knocking sensor voltage value is larger than the reference knocking occurrence determining voltage value, and "Yes" is determined at the step 706, the program goes to the step 708. At the step 708, the program goes to one of reacting control patterns g, h and i shown in FIGS. 26 through 28, respectively, against the abnormal misfire occurrence so that the electric control device 50e implements one of them.

Figure 26:
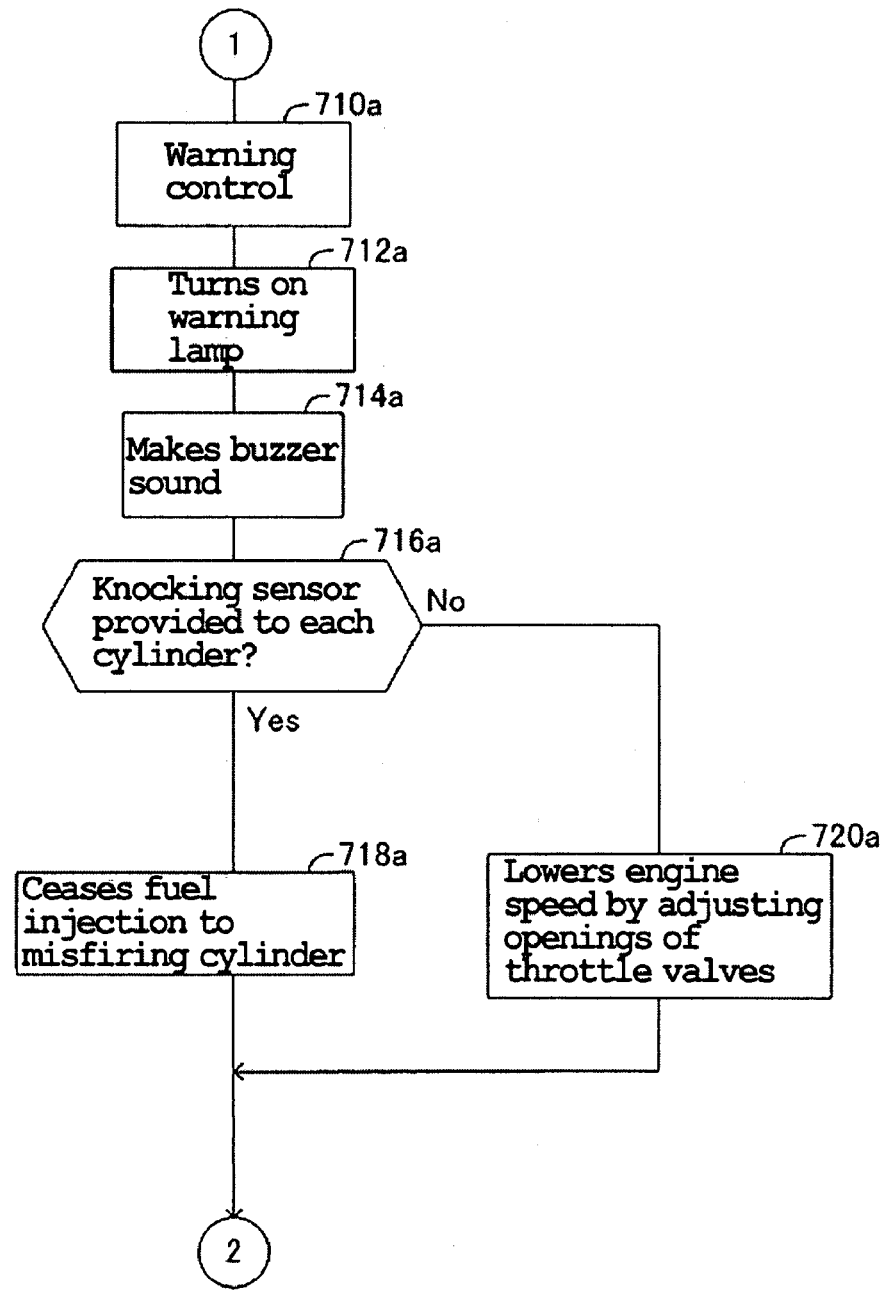
FIG. 26 is a flowchart of a program for a reacting control manner used when the program shown in FIG. 25 determines that the misfire occurs.

In the reacting control pattern g against the abnormal misfire occurrence shown in FIG. 26, at the step 710a, a command data is transmitted to the meter 14 from the electric control device 50e. Thus, the warning lamp 14b blinks at the step 712a, and the buzzer 14c sounds at the step 714a. At the step 716a, it is determined whether the knocking sensor 61 is provided to each cylinder or not. If the knocking sensor 61 is provided to each cylinder and "Yes" is determined at the step 716a, the program goes to the step 718a to cease the fuel injection to the cylinder where the misfire occurs.

The program then returns to the step 702. If the knocking sensor 62 is not provided to each cylinder and "No" is determined at the step 716a, the program goes to the step 720a to lower the engine speed of the engine 20 by adjusting the openings of the throttle valves 34. The program returns to the step 702. If the ignition device has an abnormality and "Yes" is determined at the step 702 in the flowchart of FIG. 25, the program goes to the step 726 to transmit a signal data for indicating that the ignition device has the abnormality to the predetermined portion of the meter 14 from the electric control device 50e.

Under this condition, the steps 702 and 726 are repeated until the operation of the engine 20 is stopped. If, although the ignition device has no abnormality, the knocking sensor 61 has an abnormality and "Yes" is determined at the step 704, the program goes to the step 728. At the step 728, a signal data for indicating that the knocking sensor 61 has the abnormality is transmitted to the predetermined portion of the meter 14 from the electric control device 50e. Under the condition, the steps 702, 704 and 728 are repeated until the operation of the engine 20 is stopped.

Figure 27:
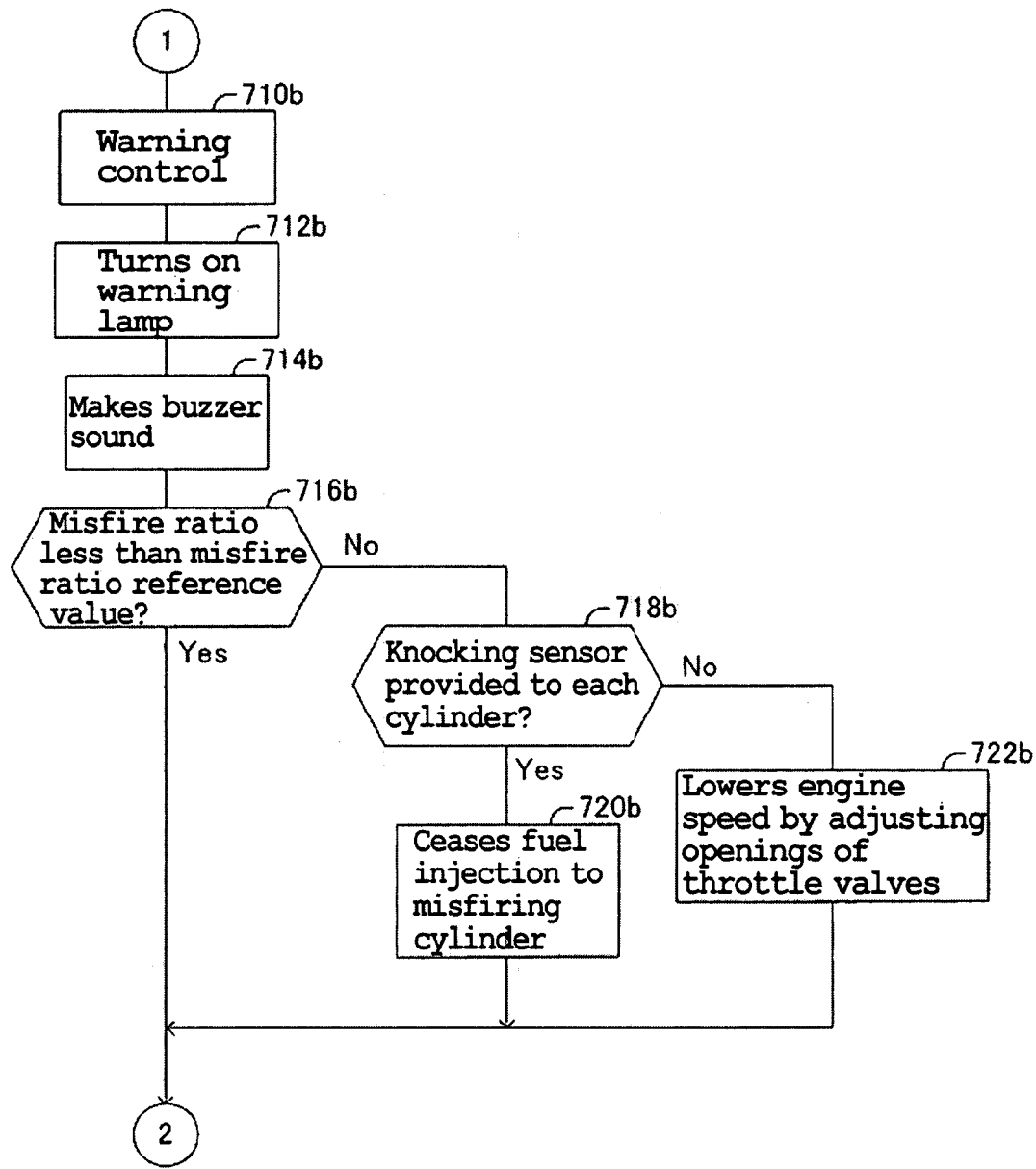
FIG. 27 is a flowchart of a program for another reacting control manner used when the program shown in FIG. 25 determines that the misfire occurs.

In the reacting control pattern h against the abnormal misfire occurrence shown in FIG. 27, the same processes as those executed at the steps 710a, 712a and 714a of the reacting control pattern g are implemented at the steps of 710b, 712b and 714b. At the step 716b, it is determined whether a misfire ratio is less than the misfire reference value or not. If the misfire ratio is less than the misfire reference value, "Yes" is determined at the step 716b and the program goes to the step 702. If the misfire ratio is equal to or greater than the misfire reference value, the program goes to the step 718b. At the step 718b, it is determined whether the knocking sensor 61 is provided to each cylinder or not. If the knocking sensor 61 is provided to each cylinder and "Yes" is determined at the step 718b, the program goes to the step 720b to cease the fuel injection to the cylinder where the misfire occurs.

Then, the program returns to the step 702. If the air-fuel ratio sensor 62 is not provided to each cylinder and "No" is determined at the step 718b, the program goes to the step 722b to lower the engine speed of the engine 20 by adjusting the openings of the throttle valves 34. The program then returns to the step 702. Afterwards, the steps 702-722b are repeated until operation of the engine 20 is stopped. Under this condition, if the ignition device has an abnormality and "Yes" is determined at the step 702, the process at the step 726 is implemented. If the ignition device has no abnormality, the knocking sensor 61 has an abnormality and "Yes" is determined at the step 704, the program goes to the step 728 to implement the process of the step 728.

Figure 28:
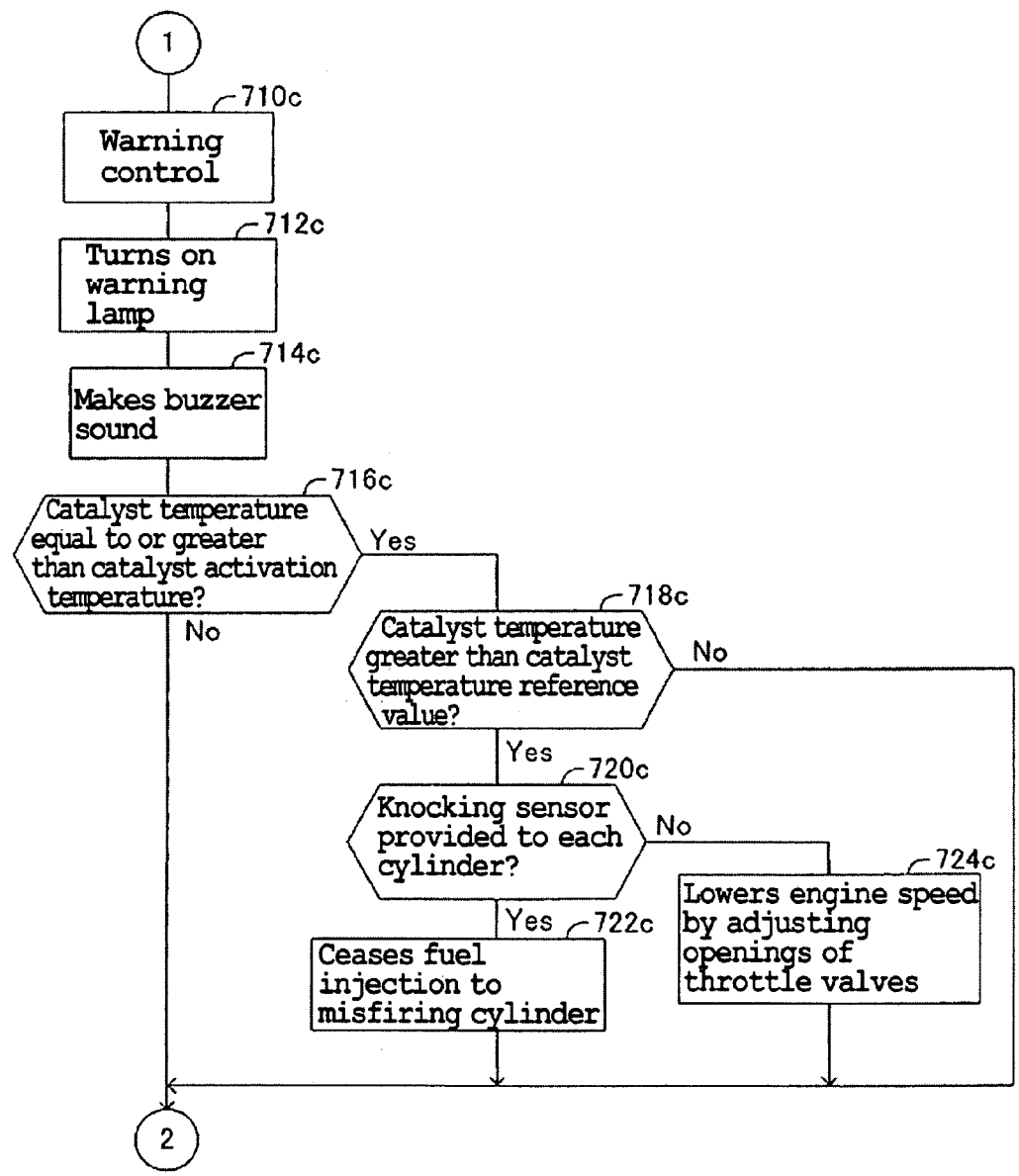
FIG. 28 is a flowchart of a program for a further reacting control manner used when the program shown in FIG. 25 determines that the misfire occurs.

In the reacting control pattern i against the abnormal misfire occurrence shown in FIG. 28, the same processes as those executed at the steps 710a, 712a and 714a of the reacting control pattern g are implemented at the steps of 710c, 712c and 714c. At the step 716c, it is determined whether a detection value of the catalyst temperature sensor 63 is equal to or greater than the catalyst activation temperature or not. If the detection value of the catalyst temperature sensor 63 is less than the catalyst activation temperature and "No" is determined at the step 716c, the program returns to 702. If the detection value of the catalyst temperature sensor 63 is equal to or greater than the catalyst activation temperature and "Yes" is determined at the step 716c, the program goes to 718c. At the step 718c, it is determined whether the detection value of the catalyst temperature sensor 63 is equal to or greater than the catalyst temperature reference value or not.

If the detection value of the catalyst temperature sensor 63 is equal to or greater than the catalyst temperature reference value and "Yes" is determined at the step 718c, the program goes to the step 720c. At the step 720c, it is determined whether the knocking sensor 61 is provided to each cylinder or not. If the knocking sensor 61 is provided to each cylinder and "Yes" is determined at the step 720c, the program goes to the step 722c to cease the fuel injection to the cylinder where the misfire occurs. The program then returns to the step 702.

If the knocking sensor 61 is not provided to each cylinder and "No" is determined at the step 720c, the program goes to the step 724c to lower the engine speed of the engine 20 by adjusting the openings of the throttle valves 34.

Then, the program returns to the step 702. Afterwards, the steps 702-724c are repeated until the operation of the engine 20 is stopped. Under this condition, if the ignition device has an abnormality and "Yes" is determined at the step 702, the process at the step 726 is implemented. If, although the ignition device has no abnormality, the knocking sensor 61 has an abnormality and "Yes" is determined at the step 704, the program goes to the step 728 to implement the process of the step 728. In this preferred embodiment, the same actions and effects as those obtained in the fourth preferred embodiment can be obtained.

The misfire detecting device for a water jet propulsion watercraft configured in accordance with the present invention is not limited to the respective preferred embodiments described above. For example, in the respective preferred embodiments described above, both the process for intermittently turning on and off the warning lamp 14b and the process for making the buzzer 14c sound are implemented. Alternatively, however, one of the processes can be selected. Also, an indicating device other than the warning lamp 14b and the buzzer 14c can be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A misfire detecting device for a water jet propulsion watercraft having an engine and a jet pump operated by the engine to propel the watercraft, the misfire detecting device comprising:
   a fuel injecting device arranged to inject fuel into the engine under a fuel injection amount adjusting control performed by a fuel injection control device;
   an igniting device arranged to ignite the fuel injected into the engine from the fuel injecting device to operate the engine;
   a misfire control device arranged to stop the igniting device from firing the fuel when a predetermined misfire condition is satisfied;
   a misfire detecting device arranged to detect that a misfire occurs in the engine;
   a misfire indicating device arranged to indicate that the misfire has occurred when the misfire detecting device detects an occurrence of the misfire in the engine; and
   an indicating inhibiting device arranged to inhibit the misfire indicating device from providing an indication that the misfire has occurred if the misfire detected by the misfire detecting device is a misfire caused by a control operation performed by the misfire control device.

2. The misfire detecting device for a water jet propulsion watercraft according to claim 1, wherein
   the misfire detecting device includes an engine speed fluctuation detecting device arranged to detect a fluctuation of an engine speed of the engine; and
   the misfire detecting device is arranged to determine that the misfire other than the misfire caused by the control operation performed by the misfire control device occurs when a fluctuation width of the engine speed detected by the engine speed fluctuation detecting device is out of a preset fluctuation width reference value of the engine speed.

3. The misfire detecting device for a water jet propulsion watercraft according to claim 1, wherein
   the misfire detecting device includes an air-fuel ratio detecting device arranged to detect an air-fuel ratio of exhaust gases discharged from the engine based upon a predetermined output voltage characteristic;
   the misfire detecting device is arranged to implement the fuel injection amount adjusting control through the fuel injection control device when a voltage value based upon the air-fuel ratio detected by the air-fuel ratio detecting device is in a range of normal voltage values; and
   the misfire detecting device is arranged to determine that the misfire other than the misfire caused by the control operation performed by the misfire control device occurs when the voltage value based upon the air-fuel ratio detected by the air-fuel ratio detecting device is higher or lower than the normal voltage value range and stops the fuel injection amount adjusting control through the fuel injection control device.

4. The misfire detecting device for a water jet propulsion watercraft according to claim 1, wherein
   the engine is a multi-cylinder engine having a plurality of cylinders, and exhaust conduits extending from exhaust ports of the respective cylinders merge into a manifold;
   the misfire detecting device is configured with an air-fuel ratio detecting device, each portion of which is positioned between the exhaust port of the respective exhaust conduit and the manifold arranged to detect an air-fuel ratio of exhaust gases discharged from the engine based upon a predetermined output voltage characteristic;
   the misfire detecting device is arranged to implement the fuel injection amount adjusting control by the fuel injection control device when a voltage value based upon the air-fuel ratio detected by the air-fuel ratio detecting device is in a range of normal voltage values; and
   the misfire detecting device is arranged to determine that the misfire other than the misfire caused by the control operation performed by the misfire control device occurs when the voltage value based upon the air-fuel ratio detected by the air-fuel ratio detecting device is higher or lower than the normal voltage value range and ceases the fuel injection to the cylinder on which the misfire detecting device determines that the misfire other than the misfire caused by the control operation performed by the misfire control device occurs.

5. The misfire detecting device for a water jet propulsion watercraft according to claim 1, wherein
   the engine is a multi-cylinder engine having a plurality of cylinders;
   the misfire detecting device includes a vibration detecting device, each portion of which is provided at the respective cylinder and arranged to detect a vibration of the engine;
   the misfire detecting device is arranged to compare an occurrence timing of a combustion signal based upon the vibration of the engine detected by each portion of the vibration detecting device and an occurrence timing of an ignition signal inputted to the igniting device; and
   the misfire detecting device is arranged to determine that the misfire other than the misfire caused by the control operation performed by the misfire control device occurs when an output amount of the combustion signal occurring in response to the ignition signal is lower than a preset normal output reference value of the combustion signal and stops the fuel injection to the cylinder on which the misfire detecting device determines that the misfire other than the misfire caused by the control operation performed by the misfire control device occurs.

6. The misfire detecting device for a water jet propulsion watercraft according to claim 1, wherein
the engine is a multi-cylinder engine having a plurality of cylinders;
the misfire detecting device includes ignition coils, each of which is provided at a respective cylinder and has an ion current detecting circuit arranged to detect a value of an ion current generated in a combustion stroke at the respective cylinder;
the misfire detecting device is arranged to compare an occurrence timing of a combustion signal based upon the value of the ion current detected by each ignition coil and an occurrence timing of an ignition signal inputted to the igniting device; and
the misfire detecting device arranged to determine that the misfire other than the misfire caused by the control operation performed by the misfire control device occurs when no combustion signal is generated in response to the ignition signal and ceases the fuel injection to the cylinder on which the misfire detecting device determines that the misfire other than the misfire caused by the control operation performed by the misfire control device occurs.

7. The misfire detecting device for a water jet propulsion watercraft according to claim 1, wherein
the engine is a multi-cylinder engine having a plurality of cylinders;
a misfire ratio determining device is arranged to determine how many times the misfire other than the misfire caused by the control operation performed by the misfire control device occurs within a predetermined period of time; and
the misfire control device is arranged to stop the fuel injection to the cylinder where the misfire whose misfire ratio is equal to or greater than a predetermined misfire ratio reference value occurs when a misfire ratio determined by the misfire ratio determining device is equal to or greater than a predetermined misfire ratio reference value.

8. The misfire detecting device for a water jet propulsion watercraft according to claim 1, wherein
the engine is a multi-cylinder engine having a plurality of cylinders;
exhaust conduits extending from exhaust ports of the respective cylinders have catalysts;
a catalyst temperature sensor is provided in close proximity to each catalyst in the respective exhaust conduit to measure a temperature of the each catalyst; and
the misfire control device stops the fuel injection to the cylinder on which the misfire detecting device determines that the misfire other than the misfire caused by the control operation performed by the misfire control device occurs when a temperature of the catalyst detected by the catalyst temperature sensor is equal to or greater than a preset catalyst temperature reference value.

9. The misfire detecting device for a water jet propulsion watercraft according to claim 1, wherein
an engine speed detecting device arranged to detect an engine speed of the engine is provided; and
the predetermined misfire condition is a condition such that the engine speed detected by the engine speed detecting device is equal to or greater than a predetermined engine speed.

10. The misfire detecting device for a water jet propulsion watercraft according to claim 1, wherein
a cooling structure using water drawn by the jet pump as a cooling water is provided to the water jet propulsion watercraft;
a cooling water amount measuring device arranged to measure an amount of the cooling water or temperature measuring device arranged to measure a temperature of the cooling water is provided; and
the predetermined misfire condition is a condition such that the amount of the cooling water measured by the cooling water amount measuring device is less than the predetermined minimum cooling water threshold amount or the temperature of the cooling water measured by the temperature measuring device is higher than the preset maximum cooling water threshold temperature.

11. The misfire detecting device for a water jet propulsion watercraft according to claim 1, wherein
a turnover detecting device arranged to detect that the water jet propulsion watercraft is overturned is provided; and
the predetermined misfire condition is a condition such that the turnover detecting device detects a turnover of the water jet propulsion watercraft.

12. The misfire detecting device for a water jet propulsion watercraft according to claim 1, wherein
an oil pressure measuring device is arranged to measure a pressure of lubricant oil lubricating the engine; and
the predetermined misfire condition is a condition such that the pressure of the lubricant oil measured by the oil pressure measuring device is less than the predetermined minimum oil pressure threshold amount.

13. The misfire detecting device for a water jet propulsion watercraft according claim 1, wherein
an engine speed detecting device is arranged to detect an engine speed of the engine and a throttle valve opening detecting device is arranged to detect an opening of a throttle valve provided to the engine are provided; and
the predetermined misfire condition is a condition such that the engine speed detected by the engine speed detecting device is less than the predetermined minimum engine speed threshold amount and the opening of the throttle valve detected by the throttle valve opening detecting device is less than the predetermined minimum throttle valve opening threshold amount.

14. A misfire detecting device for a water jet propulsion watercraft having an engine and a jet pump operated by the engine to propel the watercraft, the misfire detecting device comprising:
a fuel injecting device arranged to inject fuel into the engine under a fuel injection amount adjusting control performed by a fuel injection control device;
an igniting device arranged to ignite the fuel injected into the engine from the fuel injecting device to operate the engine;
a misfire control device arranged to stop the igniting device from firing the fuel when a predetermined misfire condition is satisfied;
a misfire detecting device arranged to detect that a misfire other than a misfire caused by a control operation performed by the misfire control device occurs in the engine; and an abnormal misfire indicating device arranged to provide an indication that the misfire has occurred when the misfire detecting device detects an occurrence of the misfire in the engine.

15. The misfire detecting device for a water jet propulsion watercraft according to claim 14, wherein
the misfire detecting device includes an engine speed fluctuation detecting device arranged to detect a fluctuation of an engine speed of the engine; and
the misfire detecting device is arranged to determine that the misfire other than the misfire caused by the control operation performed by the misfire control device occurs when a fluctuation width of the engine speed detected by the engine speed fluctuation detecting device is out of a preset fluctuation width reference value of the engine speed.

16. The misfire detecting device for a water jet propulsion watercraft according to claim 14, wherein
the misfire detecting device includes an air-fuel ratio detecting device arranged to detect an air-fuel ratio of exhaust gases discharged from the engine based upon a predetermined output voltage characteristic;
the misfire detecting device is arranged to implement the fuel injection amount adjusting control through the fuel injection control device when a voltage value based upon the air-fuel ratio detected by the air-fuel ratio detecting device is in a range of normal voltage values; and
the misfire detecting device is arranged to determine that the misfire other than the misfire caused by the control operation performed by the misfire control device occurs when the voltage value based upon the air-fuel ratio detected by the air-fuel ratio detecting device is higher or lower than the normal voltage value range and stops the fuel injection amount adjusting control through the fuel injection control device.

17. The misfire detecting device for a water jet propulsion watercraft according to claim 14, wherein
the engine is a multi-cylinder engine having a plurality of cylinders and exhaust conduits extending from exhaust ports of the respective cylinders merge into a manifold;
the misfire detecting device is configured with an air-fuel ratio detecting device, each portion of which is positioned between the exhaust port of the respective exhaust conduit and the manifold arranged to detect an air-fuel ratio of exhaust gases discharged from the engine based upon a predetermined output voltage characteristic;
the misfire detecting device is arranged to implement the fuel injection amount adjusting control by the fuel injection control device when a voltage value based upon the air-fuel ratio detected by the air-fuel ratio detecting device is in a range of normal voltage values; and
the misfire detecting device is arranged to determine that the misfire other than the misfire caused by the control operation performed by the misfire control device occurs when the voltage value based upon the air-fuel ratio detected by the air-fuel ratio detecting device is higher or lower than the normal voltage value range and ceases the fuel injection to the cylinder on which the misfire detecting device determines that the misfire other than the misfire caused by the control operation performed by the misfire control device occurs.

18. The misfire detecting device for a water jet propulsion watercraft according to claim 14, wherein
the engine is a multi-cylinder engine having a plurality of cylinders;

the misfire detecting device includes a vibration detecting device, each portion of which is provided at the respective cylinder and arranged to detect a vibration of the engine;
the misfire detecting device is arranged to compare an occurrence timing of a combustion signal based upon the vibration of the engine detected by each portion of the vibration detecting device and an occurrence timing of an ignition signal inputted to the igniting device; and
the misfire detecting device is arranged to determine that the misfire other than the misfire caused by the control operation performed by the misfire control device occurs when an output amount of the combustion signal occurring in response to the ignition signal is lower than a preset normal output reference value of the combustion signal and stops the fuel injection to the cylinder on which the misfire detecting device determines that the misfire other than the misfire caused by the control operation performed by the misfire control device occurs.

19. The misfire detecting device for a water jet propulsion watercraft according to claim 14, wherein
the engine is a multi-cylinder engine having a plurality of cylinders;
the misfire detecting device includes ignition coils, each of which is provided at a respective cylinder and has an ion current detecting circuit arranged to detect a value of an ion current generated in a combustion stroke at the respective cylinder;
the misfire detecting device is arranged to compare an occurrence timing of a combustion signal based upon the value of the ion current detected by each ignition coil and an occurrence timing of an ignition signal inputted to the igniting device; and
the misfire detecting device arranged to determine that the misfire other than the misfire caused by the control operation performed by the misfire control device occurs when no combustion signal is generated in response to the ignition signal and ceases the fuel injection to the cylinder on which the misfire detecting device determines that the misfire other than the misfire caused by the control operation performed by the misfire control device occurs.

20. The misfire detecting device for a water jet propulsion watercraft according to claim 14, wherein
the engine is a multi-cylinder engine having a plurality of cylinders;
a misfire ratio determining device is arranged to determine how many times the misfire other than the misfire caused by the control operation performed by the misfire control device occurs within a predetermined period of time; and
the misfire control device is arranged to stop the fuel injection to the cylinder where the misfire whose misfire ratio is equal to or greater than a predetermined misfire ratio reference value occurs when a misfire ratio determined by the misfire ratio determining device is equal to or greater than a predetermined misfire ratio reference value.

21. The misfire detecting device for a water jet propulsion watercraft according to claim 14, wherein
the engine is a multi-cylinder engine having a plurality of cylinders;
exhaust conduits extending from exhaust ports of the respective cylinders have catalysts;

a catalyst temperature sensor is provided in close proximity to each catalyst in the respective exhaust conduit to measure a temperature of the each catalyst; and the misfire control device stops the fuel injection to the cylinder on which the misfire detecting device determines that the misfire other than the misfire caused by the control operation performed by the misfire control device occurs when a temperature of the catalyst detected by the catalyst temperature sensor is equal to or greater than a preset catalyst temperature reference value.

22. The misfire detecting device for a water jet propulsion watercraft according to claim 14, wherein an engine speed detecting device arranged to detect an engine speed of the engine is provided; and the predetermined misfire condition is a condition such that the engine speed detected by the engine speed detecting device is equal to or greater than a predetermined engine speed.

23. The misfire detecting device for a water jet propulsion watercraft according to claim 14, wherein a cooling structure using water drawn by the jet pump as a cooling water is provided to the water jet propulsion watercraft;

a cooling water amount measuring device arranged to measure an amount of the cooling water or temperature measuring device arranged to measure a temperature of the cooling water is provided; and the predetermined misfire condition is a condition such that the amount of the cooling water measured by the cooling water amount measuring device is less than the predetermined minimum cooling water threshold amount or the temperature of the cooling water measured by the temperature measuring device is higher than the preset maximum cooling water threshold temperature.

24. The misfire detecting device for a water jet propulsion watercraft according to claim 14, wherein a turnover detecting device arranged to detect that the water jet propulsion watercraft is overturned is provided; and the predetermined misfire condition is a condition such that the turnover detecting device detects a turnover of the water jet propulsion watercraft.

25. The misfire detecting device for a water jet propulsion watercraft according to claim 14, wherein an oil pressure measuring device is arranged to measure a pressure of lubricant oil lubricating the engine; and the predetermined misfire condition is a condition such that the pressure of the lubricant oil measured by the oil pressure measuring device is less than the predetermined minimum oil pressure threshold amount.

26. The misfire detecting device for a water jet propulsion watercraft according claim 14, wherein an engine speed detecting device is arranged to detect an engine speed of the engine and a throttle valve opening detecting device is arranged to detect an opening of a throttle valve provided to the engine are provided; and the predetermined misfire condition is a condition such that the engine speed detected by the engine speed detecting device is less than the predetermined minimum engine speed threshold amount and the opening of the throttle valve detected by the throttle valve opening detecting device is less than the predetermined minimum throttle valve opening threshold amount.

* * * * *